United States Patent
Wang et al.

(10) Patent No.: US 11,233,548 B2
(45) Date of Patent: Jan. 25, 2022

(54) FAST BEAM TRACKING

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/963,426

(22) PCT Filed: Aug. 29, 2019

(86) PCT No.: PCT/US2019/048811
§ 371 (c)(1),
(2) Date: Jul. 20, 2020

(87) PCT Pub. No.: WO2020/055602
PCT Pub. Date: Mar. 19, 2020

(65) Prior Publication Data
US 2020/0403658 A1    Dec. 24, 2020

Related U.S. Application Data

(60) Provisional application No. 62/729,374, filed on Sep. 10, 2018.

(51) Int. Cl.
*H04B 7/02* (2018.01)
*H04B 7/0417* (2017.01)
(Continued)

(52) U.S. Cl.
CPC ......... *H04B 7/0417* (2013.01); *H04B 7/0617* (2013.01); *H04L 5/0023* (2013.01); *H04W 72/1273* (2013.01); *H04W 72/14* (2013.01)

(58) Field of Classification Search
CPC .. H04B 7/0417; H04B 7/0617; H04B 7/0695; H04L 5/0023; H04L 5/0048;
(Continued)

(56) References Cited

U.S. PATENT DOCUMENTS

| 5,543,811 A | 8/1996 | Chethik |
| 6,711,224 B1 | 3/2004 | Benning et al. |

(Continued)

FOREIGN PATENT DOCUMENTS

| CN | 106664127 | 5/2017 |
| EP | 3081041 | 10/2016 |

(Continued)

OTHER PUBLICATIONS

"Corrected Notice of Allowance", U.S. Appl. No. 15/844,093, filed Dec. 9, 2020, 3 pages.

(Continued)

*Primary Examiner* — Helene E Tayong
(74) *Attorney, Agent, or Firm* — Colby Nipper PLLC

(57) ABSTRACT

To employ beamforming to increase signaling distances, one wireless device trains a beamformer using a signal being received from another wireless device. The trained beamformer can then communicate with the other device via a signal beam until channel conditions change. In example implementations, a base station (BS) reserves an air interface resource unit for beamformer training in conjunction with allocating an air interface resource unit for downlink data. The BS transmits a downlink control channel communication to a user equipment (UE) with a downlink data grant indicative of the allocated resource unit. During the reserved resource unit, the UE transmits an uplink tracking communication, which can include a pilot signal, to the BS for beamform training. The BS then uses the freshly trained beamformer to transmit the downlink data as a downlink data channel communication via a downlink beam during the allocated resource unit.

20 Claims, 11 Drawing Sheets

(51) Int. Cl.
  *H04B 7/06*    (2006.01)
  *H04L 5/00*    (2006.01)
  *H04W 72/12*   (2009.01)
  *H04W 72/14*   (2009.01)

(58) Field of Classification Search
  CPC .............. H04L 5/0007; H04L 5/0053; H04W 72/1273; H04W 72/14
  USPC ........................................................ 375/267
  See application file for complete search history.

(56)            References Cited

U.S. PATENT DOCUMENTS

| | | | |
|---|---|---|---|
| 8,315,185 | B2 | 11/2012 | Chan |
| 8,346,286 | B2 | 1/2013 | Lee et al. |
| 8,543,063 | B2 | 9/2013 | Bergel et al. |
| 8,594,053 | B2 | 11/2013 | Kim et al. |
| 8,605,644 | B2 | 12/2013 | Wang |
| 8,681,809 | B2 * | 3/2014 | Sambhwani .......... H04B 7/0693 370/431 |
| 8,774,150 | B1 | 7/2014 | Jeffery et al. |
| 8,923,192 | B2 | 12/2014 | Gong |
| 8,958,382 | B2 * | 2/2015 | Kim ...................... H04L 5/0053 370/329 |
| 9,060,324 | B1 | 6/2015 | Goyal et al. |
| 9,124,395 | B2 | 9/2015 | Lin et al. |
| 9,204,441 | B2 | 12/2015 | Nagaraja et al. |
| 9,253,766 | B2 | 2/2016 | Yang et al. |
| 9,258,798 | B2 | 2/2016 | Li et al. |
| 9,271,290 | B2 | 2/2016 | Pelletier et al. |
| 9,332,456 | B2 | 5/2016 | Heo et al. |
| 9,414,430 | B2 | 8/2016 | Vajapeyam et al. |
| 9,425,923 | B2 | 8/2016 | Ratasuk et al. |
| 9,648,637 | B2 | 5/2017 | Yang et al. |
| 9,681,451 | B1 * | 6/2017 | Liu ........................ H04W 16/04 |
| 9,686,667 | B2 | 6/2017 | Artuso |
| 9,900,133 | B2 | 2/2018 | Lu et al. |
| 10,080,244 | B2 | 9/2018 | Lei et al. |
| 10,084,535 | B1 | 9/2018 | Speidel et al. |
| 10,148,329 | B2 | 12/2018 | Yue et al. |
| 10,218,422 | B2 | 2/2019 | Raghavan et al. |
| 10,375,671 | B2 | 8/2019 | Stauffer et al. |
| 10,512,008 | B2 * | 12/2019 | Deenoo ................... H04W 8/22 |
| 10,524,266 | B2 | 12/2019 | Wang |
| 10,608,721 | B2 | 3/2020 | Wang et al. |
| 10,700,769 | B2 | 6/2020 | Wang et al. |
| 2005/0047322 | A1 | 3/2005 | Sondur |
| 2006/0205346 | A1 | 9/2006 | Evans et al. |
| 2008/0018427 | A1 | 1/2008 | Ezra et al. |
| 2009/0102715 | A1 | 4/2009 | Lou et al. |
| 2009/0116569 | A1 | 5/2009 | Jin |
| 2009/0180451 | A1 | 7/2009 | Alpert et al. |
| 2010/0194650 | A1 | 8/2010 | Goransson et al. |
| 2010/0304680 | A1 | 12/2010 | Kuffner et al. |
| 2011/0002373 | A1 | 1/2011 | Jeon |
| 2011/0128866 | A1 | 6/2011 | Tian et al. |
| 2011/0205981 | A1 | 8/2011 | Koo et al. |
| 2012/0021322 | A1 * | 1/2012 | Brighton, II ......... H01M 8/04089 429/444 |
| 2012/0027111 | A1 * | 2/2012 | Vook .................... H04B 7/0452 375/267 |
| 2012/0039280 | A1 | 2/2012 | Chen et al. |
| 2012/0140743 | A1 | 6/2012 | Pelletier et al. |
| 2012/0208547 | A1 | 8/2012 | Geirhofer et al. |
| 2012/0275384 | A1 | 11/2012 | Long et al. |
| 2012/0295623 | A1 | 11/2012 | Siomina et al. |
| 2013/0155975 | A1 * | 6/2013 | Dinan .................. H04B 7/0478 370/329 |
| 2013/0223251 | A1 | 8/2013 | Li et al. |
| 2013/0286960 | A1 | 10/2013 | Li et al. |
| 2013/0288667 | A1 * | 10/2013 | Tsui ...................... H04B 17/327 455/425 |
| 2013/0301454 | A1 | 11/2013 | Seol et al. |
| 2014/0146732 | A1 | 5/2014 | Olufunmilo et al. |
| 2014/0148107 | A1 | 5/2014 | Maltsev et al. |
| 2014/0211739 | A1 | 7/2014 | Kim et al. |
| 2014/0213277 | A1 | 7/2014 | Jang |
| 2014/0307693 | A1 * | 10/2014 | Feng .................... H04L 5/0053 370/329 |
| 2014/0362752 | A1 | 12/2014 | Jha et al. |
| 2014/0362811 | A1 | 12/2014 | Lin et al. |
| 2015/0065133 | A1 | 3/2015 | Cui et al. |
| 2015/0126239 | A1 | 5/2015 | Kim et al. |
| 2015/0208458 | A1 | 7/2015 | Pelletier et al. |
| 2015/0289147 | A1 | 10/2015 | Lou et al. |
| 2015/0382205 | A1 | 12/2015 | Lee et al. |
| 2016/0014664 | A1 | 1/2016 | Singh et al. |
| 2016/0029235 | A1 | 1/2016 | Kim et al. |
| 2016/0050002 | A1 | 2/2016 | Wei et al. |
| 2016/0072564 | A1 | 3/2016 | Li et al. |
| 2016/0099763 | A1 | 4/2016 | Chen |
| 2016/0119846 | A1 | 4/2016 | Chou et al. |
| 2016/0127997 | A1 | 5/2016 | Ang et al. |
| 2016/0135213 | A1 | 5/2016 | Zhu et al. |
| 2016/0157267 | A1 | 6/2016 | Mattias et al. |
| 2016/0191132 | A1 | 6/2016 | Rajogopal et al. |
| 2016/0205679 | A1 | 7/2016 | Yoo et al. |
| 2016/0226640 | A1 | 8/2016 | Seol et al. |
| 2016/0234736 | A1 | 8/2016 | Kubota et al. |
| 2016/0242159 | A1 | 8/2016 | Ho et al. |
| 2016/0270027 | A1 | 9/2016 | Ang et al. |
| 2016/0277225 | A1 | 9/2016 | Frenne et al. |
| 2016/0286524 | A1 | 9/2016 | Griot et al. |
| 2016/0294531 | A1 | 10/2016 | Loehr et al. |
| 2016/0345189 | A1 | 11/2016 | Miyagawa et al. |
| 2016/0345234 | A1 | 11/2016 | Yang et al. |
| 2016/0353424 | A1 | 12/2016 | Stirling-Gllacher et al. |
| 2017/0026293 | A1 | 1/2017 | Desclos et al. |
| 2017/0026962 | A1 | 1/2017 | Liu et al. |
| 2017/0034812 | A1 | 2/2017 | Deng et al. |
| 2017/0104561 | A1 | 4/2017 | Agardh et al. |
| 2017/0134913 | A1 | 5/2017 | Cui et al. |
| 2017/0142592 | A1 | 5/2017 | Fischer et al. |
| 2017/0149480 | A1 | 5/2017 | Kakishima et al. |
| 2017/0180095 | A1 | 6/2017 | Xue et al. |
| 2017/0195031 | A1 | 7/2017 | Onggonsanusi et al. |
| 2017/0201982 | A1 | 7/2017 | Alvarino et al. |
| 2017/0208589 | A1 | 7/2017 | Majjigi et al. |
| 2017/0223744 | A1 | 8/2017 | Qian et al. |
| 2017/0237783 | A1 | 8/2017 | Yang et al. |
| 2017/0244523 | A1 | 8/2017 | Yang et al. |
| 2017/0257842 | A1 | 9/2017 | Hessler et al. |
| 2017/0264350 | A1 | 9/2017 | Sanderovich et al. |
| 2017/0295578 | A1 | 10/2017 | Khoshnevisan et al. |
| 2017/0310417 | A1 | 10/2017 | Jung et al. |
| 2017/0331577 | A1 | 11/2017 | Parkvall et al. |
| 2017/0331670 | A1 | 11/2017 | Parkvall et al. |
| 2017/0347334 | A1 | 11/2017 | Akkarakaran et al. |
| 2017/0367046 | A1 | 12/2017 | Papasakellariou |
| 2017/0367069 | A1 | 12/2017 | Agiwal et al. |
| 2017/0374579 | A1 | 12/2017 | Wang et al. |
| 2018/0014251 | A1 | 1/2018 | Sambhwani et al. |
| 2018/0020462 | A1 | 1/2018 | Xiong et al. |
| 2018/0027419 | A1 | 1/2018 | Xu |
| 2018/0049177 | A1 | 2/2018 | Islam et al. |
| 2018/0070282 | A1 | 3/2018 | Su et al. |
| 2018/0077734 | A1 | 3/2018 | Kim et al. |
| 2018/0103426 | A1 | 4/2018 | Nacer et al. |
| 2018/0109353 | A1 | 4/2018 | Kwak et al. |
| 2018/0110066 | A1 | 4/2018 | Luo et al. |
| 2018/0124612 | A1 | 5/2018 | Babaei et al. |
| 2018/0139014 | A1 | 5/2018 | Xiong et al. |
| 2018/0139615 | A1 | 5/2018 | Cui et al. |
| 2018/0139701 | A1 | 5/2018 | Wang et al. |
| 2018/0145732 | A1 | 5/2018 | Shen et al. |
| 2018/0176955 | A1 | 6/2018 | Salem et al. |
| 2018/0184422 | A1 | 6/2018 | Cavalcanti et al. |
| 2018/0191415 | A1 | 7/2018 | Aryafar et al. |
| 2018/0199306 | A1 | 7/2018 | Stephen et al. |
| 2018/0206217 | A1 | 7/2018 | Martin et al. |
| 2018/0206268 | A1 | 7/2018 | Abdallah et al. |
| 2018/0213529 | A1 | 7/2018 | Lee et al. |
| 2018/0227902 | A1 | 8/2018 | Gholmieh et al. |

(56) References Cited

U.S. PATENT DOCUMENTS

| | | |
|---|---|---|
| 2018/0227960 A1 | 8/2018 | Belghoul et al. |
| 2018/0242160 A1 | 8/2018 | Morita et al. |
| 2018/0279303 A1 | 9/2018 | Sun et al. |
| 2018/0279324 A1 | 9/2018 | Wang et al. |
| 2018/0295552 A1 | 10/2018 | Chakraborty et al. |
| 2018/0332605 A1 | 11/2018 | Pelletier |
| 2018/0343043 A1 | 11/2018 | Hakola et al. |
| 2018/0367230 A1 | 12/2018 | Su et al. |
| 2019/0007844 A1 | 1/2019 | Müller et al. |
| 2019/0007963 A1 | 1/2019 | Akkarakaran et al. |
| 2019/0029005 A1 | 1/2019 | Bendlin et al. |
| 2019/0037495 A1 | 1/2019 | Wilson et al. |
| 2019/0037560 A1 | 1/2019 | Huang et al. |
| 2019/0037586 A1 | 1/2019 | Park et al. |
| 2019/0052419 A1 | 2/2019 | Yang et al. |
| 2019/0058516 A1 | 2/2019 | Yang et al. |
| 2019/0069321 A1 | 2/2019 | Akkarakaran et al. |
| 2019/0089436 A1 | 3/2019 | Wei et al. |
| 2019/0089443 A1 | 3/2019 | Malik et al. |
| 2019/0089506 A1 | 3/2019 | Takeda et al. |
| 2019/0123798 A1 | 4/2019 | Lou et al. |
| 2019/0124664 A1 | 4/2019 | Wang |
| 2019/0132830 A1 | 5/2019 | Tabet et al. |
| 2019/0141767 A1 | 5/2019 | Wang et al. |
| 2019/0159140 A1 | 5/2019 | Wang et al. |
| 2019/0173626 A1 | 6/2019 | Wang et al. |
| 2019/0174433 A1 | 6/2019 | Nory et al. |
| 2019/0174497 A1 | 6/2019 | Wang et al. |
| 2019/0182850 A1 | 6/2019 | Wang et al. |
| 2019/0190577 A1 | 6/2019 | Wang et al. |
| 2019/0190591 A1 | 6/2019 | Wang et al. |
| 2019/0190641 A1 | 6/2019 | Wang et al. |
| 2019/0190676 A1 | 6/2019 | Wang et al. |
| 2019/0191440 A1 | 6/2019 | Wang et al. |
| 2019/0200322 A1 | 6/2019 | Wang et al. |
| 2019/0229789 A1 | 7/2019 | Zhang et al. |
| 2019/0230603 A1 | 7/2019 | Liu et al. |
| 2019/0230607 A1 | 7/2019 | Chung et al. |
| 2019/0239168 A1 | 8/2019 | Li et al. |
| 2019/0261281 A1 | 8/2019 | Jung et al. |
| 2019/0261380 A1 | 8/2019 | Iyer et al. |
| 2019/0288809 A1 | 9/2019 | Iyer et al. |
| 2019/0289476 A1 | 9/2019 | Chen et al. |
| 2019/0305835 A1 | 10/2019 | Wang et al. |
| 2019/0306830 A1 | 10/2019 | Wang et al. |
| 2019/0342825 A1 | 11/2019 | Liu |
| 2019/0349968 A1 | 11/2019 | Yerramalli et al. |
| 2019/0356368 A1 | 11/2019 | Liu et al. |
| 2019/0373557 A1 | 12/2019 | Agardh et al. |
| 2019/0380140 A1 | 12/2019 | Wong et al. |
| 2020/0028745 A1 | 1/2020 | Parkvall et al. |
| 2020/0052782 A1 | 2/2020 | Wang et al. |

FOREIGN PATENT DOCUMENTS

| | | |
|---|---|---|
| EP | 3105958 | 12/2016 |
| EP | 3123802 | 2/2017 |
| EP | 3443704 | 2/2019 |
| KR | 100860050 | 9/2008 |
| WO | 2013070149 | 5/2013 |
| WO | 2013179095 | 12/2013 |
| WO | 2015086215 | 6/2015 |
| WO | 2012074878 | 7/2015 |
| WO | 2016119882 | 8/2016 |
| WO | 2016133106 | 8/2016 |
| WO | 2016184277 | 11/2016 |
| WO | 2016204811 | 12/2016 |
| WO | 2017011802 | 1/2017 |
| WO | 2017025366 | 2/2017 |
| WO | 2017030601 | 2/2017 |
| WO | 2017083514 | 5/2017 |
| WO | 2017088898 | 6/2017 |
| WO | 2017109549 | 6/2017 |
| WO | 2017111987 | 6/2017 |
| WO | 2017117340 | 7/2017 |
| WO | 2017127126 | 7/2017 |
| WO | 2017146773 | 8/2017 |
| WO | 2017150863 | 9/2017 |
| WO | 2017195463 | 11/2017 |
| WO | 2017196243 | 11/2017 |
| WO | 2018028579 | 2/2018 |
| WO | 2018031846 | 2/2018 |
| WO | 2018034998 | 2/2018 |
| WO | 2018064068 | 4/2018 |
| WO | 2018083253 | 5/2018 |
| WO | 2018084757 | 5/2018 |
| WO | 2018130115 | 7/2018 |
| WO | 2019078938 | 4/2019 |
| WO | 2019094078 | 5/2019 |
| WO | 2019112648 | 6/2019 |
| WO | 2019118020 | 6/2019 |
| WO | 2019118021 | 6/2019 |
| WO | 2019118023 | 6/2019 |
| WO | 2019118787 | 6/2019 |
| WO | 2019118915 | 6/2019 |
| WO | 2019126791 | 6/2019 |
| WO | 2019190638 | 10/2019 |
| WO | 2019193768 | 10/2019 |
| WO | 2020055602 | 3/2020 |

OTHER PUBLICATIONS

"Non-Final Office Action", U.S. Appl. No. 15/844,093, filed Jan. 4, 2021, 12 pages.

"Non-Final Office Action", U.S. Appl. No. 15/939,129, filed Oct. 29, 2020, 15 pages.

"3rd Generation Partnership Project", Technical Specification Group Radio Access Network; NR and NG-RAN Overall; 3GPP Standard; Technical Specification; 3GPP TS 38.300, 3rd Generation Partnership Project (3GPP), Mobile Competence Centre, Nov. 17, 2017, 56 pages.

"3rd Generation Partnership Project; Technical Specification Group Radio Access Network", Evolved Universal Terrestrial Radio Access (E-UTRA) and NR; Multi-connectivity; Stage 2 (Release 15); 3GPP Standard; Technical Specification; 3GPP TS 37.340, 3rd Generation Partnership Project (3GPP), Mobile Competence Centre, Nov. 17, 2017, 49 pages.

"5G; Study on New Radio (NR) access technology (3GPP TR 38.912 version 14.0.0 Release 14)", ETSI TR 138 912 V14.0.0 (May 2017), May 2017, 77 pages.

"Dragonfly Narrowband IoT Unveiled with GNSS Option", GPS World Staff; Retrieved from http://gpsworld.com/dragonfly-narrowband-iot-unveiled-with-gnss-option/ on Dec. 7, 2017, Mar. 7, 2017, 5 pages.

"Evolved Universal Terrestrial Radio Access (E-UTRA)", 3rd Generation Partnership Project; Technical Specification Group Radio Access Network; Evolved Universal Terrestrial Radio Access (E-UTRA); Radio Resource Control (RRC); Protocol specification (Release 10), Mar. 2013, 307 pages.

"Final Office Action", U.S. Appl. No. 15/939,129, dated Jun. 11, 2020, 13 Pages.

"Final Office Action", U.S. Appl. No. 15/833,312, dated Oct. 7, 2019, 15 Pages.

"Final Office Action", U.S. Appl. No. 15/842,318, dated Jul. 10, 2019, 15 Pages.

"Final Office Action", U.S. Appl. No. 15/939,060, dated Nov. 29, 2019, 17 pages.

"Final Office Action", U.S. Appl. No. 15/832,395, dated Apr. 2, 2020, 23 Pages.

"First Action Interview Office Action", U.S. Appl. No. 15/939,129, dated Sep. 16, 2019, 3 Pages.

"First Action Interview Office Action", U.S. Appl. No. 15/842,318, dated May 7, 2019, 3 pages.

"First Action Interview Office Action", U.S. Appl. No. 15/844,093, dated Sep. 16, 2019, 4 Pages.

"First Action Interview Office Action", U.S. Appl. No. 16/142,952, dated Jan. 30, 2020, 6 Pages.

"Foreign Office Action", EP Application No. 18830637.7, dated Jul. 7, 2020, 7 pages.

(56) References Cited

OTHER PUBLICATIONS

"International Preliminary Report on Patentability", Application No. PCT/US2018/049407, dated Jun. 25, 2020, 12 pages.
"International Preliminary Report on Patentability", Application No. PCT/US2018/043887, dated Jan. 22, 2020, 13 pages.
"International Preliminary Report on Patentability", Application No. PCT/US2018/041696, dated Jun. 18, 2020, 14 pages.
"International Preliminary Report on Patentability", Application No. PCT/US2019/017109, dated Jun. 23, 2020, 18 pages.
"International Preliminary Report on Patentability", Application No. PCT/US2018/049403, dated Mar. 13, 2020, 20 pages.
"International Preliminary Report on Patentability", Application No. PCT/US2018/065829, dated Jun. 25, 2020, 20 pages.
"International Preliminary Report on Patentability", Application No. PCT/US2018/046004, dated Jan. 23, 2020, 21 pages.
"International Preliminary Report on Patentability", Application No. PCT/US2018/067367, dated Mar. 17, 2020, 23 pages.
"International Preliminary Report on Patentability", Application No. PCT/US2018/065557, dated Jun. 25, 2020, 29 pages.
"International Preliminary Report on Patentability", Application No. PCT/US2018/050487, dated Jun. 25, 2020, 8 pages.
"International Search Report and Written Opinion", Application No. PCT/US2018/046004, dated Nov. 22, 2018, 13 pages.
"International Search Report and Written Opinion", Application No. PCT/2018/050487, dated Nov. 26, 2018, 13 pages.
"International Search Report and Written Opinion", Application No. PCT/US2019/017109, dated Mar. 28, 2019, 15 pages.
"International Search Report and Written Opinion", Application No. PCT/US2018/043887, dated Nov. 6, 2018, 17 pages.
"International Search Report and Written Opinion", Application No. PCT/US2018/049407, dated Dec. 14, 2018, 18 pages.
"International Search Report and Written Opinion", Application No. PCT/US2018/067367, dated Mar. 20, 2019, 19 pages.
"International Search Report and Written Opinion", Application No. PCT/US2018/049403, dated Jan. 16, 2019, 21 pages.
"International Search Report and Written Opinion", Application No. PCT/US2018/043887, dated Nov. 6, 2018, 21 pages.
"International Search Report and Written Opinion", Application No. PCT/US2018/065829, dated Jun. 18, 2019, 28 pages.
"International Search Report and Written Opinion", Application No. PCT/US2018/041696, dated Oct. 9, 2018, 30 pages.
"International Search Report and Written Opinion", Application No. PCT/US2018/065557, dated Jun. 21, 2019, 38 pages.
"Invitation to Pay Additional Fees", Application No. PCT/US2018/049403, dated Nov. 19, 2018, 13 pages.
"Invitation to Pay Additional Fees", Application No. PCT/US2018/065829, dated Mar. 15, 2019, 13 pages.
"Invitation to Pay Additional Fees", Application No. PCT/US2018/065557, dated Mar. 13, 2019, 19 pages.
"Leading the LTE IoT Evolution to Connect the Massive Internet of Things", Qualcomm, Inc., Jun. 2017, 41 pages.
"NB-IOT, Accelerating Cellular IOT", Huawei; Roads to MBB 2020; Building a Better Connected World; Global Mobile Broadband Forum 2015; Hong Kong, Nov. 2-5, 2015, 4 pages.
"Non-Final Office Action", U.S. Appl. No. 15/788,948, dated Nov. 29, 2018, 12 pages.
"Non-Final Office Action", U.S. Appl. No. 15/842,241, dated Mar. 11, 2019, 12 pages.
"Non-Final Office Action", U.S. Appl. No. 15/939,060, dated May 23, 2019, 15 pages.
"Non-Final Office Action", U.S. Appl. No. 15/833,312, dated Jun. 4, 2020, 17 Pages.
"Non-Final Office Action", U.S. Appl. No. 15/832,395, dated Feb. 27, 2019, 18 pages.
"Non-Final Office Action", U.S. Appl. No. 15/832,395, dated Aug. 30, 2019, 20 Pages.
"Non-Final Office Action", U.S. Appl. No. 16/126,920, dated Jan. 29, 2020, 21 Pages.
"Non-Final Office Action", U.S. Appl. No. 16/105,948, dated Mar. 27, 2020, 21 Pages.
"Non-Final Office Action", U.S. Appl. No. 15/852,572, dated Sep. 14, 2018, 6 pages.
"Non-Final Office Action", U.S. Appl. No. 16/446,416, dated Oct. 18, 2019, 7 Pages.
"Notice of Allowance", U.S. Appl. No. 15/844,093, dated Mar. 2, 2020, 10 Pages.
"Notice of Allowance", U.S. Appl. No. 15/844,093, dated Sep. 16, 2020, 10 Pages.
"Notice of Allowance", U.S. Appl. No. 15/844,093, dated May 13, 2020, 11 Pages.
"Notice of Allowance", U.S. Appl. No. 15/842,241, dated Dec. 5, 2019, 5 Pages.
"Notice of Allowance", U.S. Appl. No. 15/852,572, dated Mar. 11, 2019, 5 pages.
"Notice of Allowance", U.S. Appl. No. 15/842,241, dated Aug. 5, 2019, 6 pages.
"Notice of Allowance", U.S. Appl. No. 16/126,920, dated Apr. 29, 2020, 8 Pages.
"Notice of Allowance", U.S. Appl. No. 15/788,948, dated Jul. 12, 2019, 8 Pages.
"Notice of Allowance", U.S. Appl. No. 15/788,948, dated Oct. 21, 2019, 8 Pages.
"Notice of Allowance", U.S. Appl. No. 16/142,952, dated Feb. 28, 2020, 9 Pages.
"Pre-Interview Communication", U.S. Appl. No. 15/939,129, dated Jun. 24, 2019, 3 pages.
"Pre-Interview Communication", U.S. Appl. No. 15/842,318, dated Mar. 29, 2019, 4 pages.
"Pre-Interview Communication", U.S. Appl. No. 15/833,312, dated Apr. 19, 2019, 4 pages.
"Pre-Interview Communication", U.S. Appl. No. 16/142,952, dated Dec. 20, 2019, 5 Pages.
"Pre-Interview Communication", U.S. Appl. No. 15/844,093, dated Jun. 28, 2019, 5 pages.
"Procedures Associated with Access and Operation of Uplink Common Packet Channel and the Associated Downlink Dedicated Control Channel", TSG-RAN WG 1#4 TSGR1#4(99) 371, Apr. 19-20, 1999, Yokohama, Japan, Apr. 1999, 10 pages.
"Progress on LAA and its Relationship to LTE-U and MulteFire", Feb. 2016, 33 pages.
"Restriction Requirement", U.S. Appl. No. 15/842,318, dated Oct. 4, 2018, 7 pages.
"Restriction Requirement", U.S. Appl. No. 15/852,572, dated Jun. 11, 2018, 9 pages.
"UE Overheating for EN-DC", 3GPP R2-1802414, UE overheating for EN-DC, in 3GPP TSG-RAN WG2 Meeting #101, Apple Inc., Mar. 2, 2018, 3 pages.
"Written Opinion", Application No. PCT/US2018/065557, dated Feb. 4, 2020, 13 pages.
"Written Opinion", Application No. PCT/US2018/065557, dated Nov. 15, 2019, 4 pages.
"Written Opinion", Application No. PCT/US2019/017109, dated Mar. 2, 2020, 6 pages.
"Written Opinion", Application No. PCT/US2018/049407, dated Oct. 21, 2019, 8 pages.
"Written Opinion", Application No. PCT/US2018/049403, dated Oct. 25, 2019, 8 pages.
"Written Opinion", Application No. PCT/US2018/043887, dated Sep. 30, 2019, 9 pages.
"Written Opinion", Application No. PCT/US2018/046004, dated Oct. 21, 2019, 6 pages.
Dutta, Sourja et al., "Frame Structure Design and Analysis for Millimeter Wave Cellular Systems", avix.org; NYU Wireless, New York University Tandon School of Engineering, Aug. 20, 2016, 31 pages.
Gineste, Mathieu et al., "Narrowband IoT Service Provision to 5G User Equipment Via A Satellite Component", 2017 IEEE Globecom Workshops, IEEE, Dec. 4, 2017, Dec. 4, 2017, 4 pages.
Guidotti, Alessandro et al., "LTE-Based Satellite Communications in LEO Mega-Constellations", 2017 John Wiley & Sons, Ltd., Dec. 2017, 17 pages.

(56) References Cited

OTHER PUBLICATIONS

Jantti, Riku "Machine Type Communications for Internet of Things—Recent advances and future possibilities", WNCG; Seminar, Oct. 7, 2016, 1 page.

Landstrom, Sara et al., "NB-IOT: A Sustainable Technology for Connecting Billions of Devices", Ericsson Technology Review; Standardizing Narrowband IoT, Apr. 22, 2016, 12 pages.

O'Hara, Kenneth M. et al., "Providing Narrowband IoT Coverage with Low Earth Orbit Satellites", 2019 Horizon House Publications, Inc., Dec. 2019, 4 pages.

Pederson, Klaus I. et al., "A Flexible Frame Structure for 5G Wide Area", Aalborg University, Proceedings of IEEE VTC, Sep. 2015, 6 pages.

Thales, et al., "FS_5GSAT, Draft Use Case, Internet of Things with a Satellite Component", 3GPP TSG-SA WG1 Meeting #80 S1-174441 Reno, Nevada, USA, 2017, Dec. 2017, 2 pages.

Wu, Chih-Hsiang "Handling Overheating in a Wireless-Communication Device", Technical Disclosure Commons; Retrieved from https://www.tdcommons.org/dpubs_series/2343, Jul. 12, 2019, 22 pages.

Xiao, Jie et al., "An Adaptive Channel Access Mechanism for LTE-U and WiFi Coexistence in an Unlicensed Spectrum", Dec. 2015, 6 pages.

"International Search Report and Written Opinion", PCT Application No. PCT/US2019/048811, dated Dec. 4, 2019, 15 pages.

"Tracking mm-Wave Channel Dynamics: Fast Beam Training Strategies Under Mobility", IMDEA Networks Institute, Madrid, Spain, Dec. 23, 2016, 11 pages.

"Final Office Action", U.S. Appl. No. 15/939,129, dated Apr. 5, 2021, 17 pages.

"International Preliminary Report on Patentability", Application No. PCT/US2019/048811, dated Mar. 9, 2021, 8 page.

"Foreign Office Action", CN Application No. 201880070673.0, dated Aug. 27, 2021, 26 pages.

"Notice of Allowance", U.S. Appl. No. 15/939,129, dated Jul. 19, 2021, 7 pages.

"Notice of Allowance", U.S. Appl. No. 15/844,093, dated Aug. 13, 2021, 16 pages.

"Notice of Allowance", U.S. Appl. No. 15/939,129, dated Oct. 26, 2021, 9 pages.

* cited by examiner

FAST BEAM TRACKING

PRIORITY APPLICATIONS

This application claims the benefit of U.S. Provisional Patent Application 62/729,374, filed 10 Sep. 2018, and claims priority to and is a continuation application of International Application No. PCT/US2019/048811, filed 29 Aug. 2019, the disclosures of both are incorporated herein by reference in their entirety.

BACKGROUND

With cellular communications technology, a communication between two endpoints usually has both a wireless portion and a wired portion. A portion of the communication that is near one party is instituted using a wireless connection between a user equipment (e.g., a smartphone) and a base station, which is part of a cellular or other radio access network of a larger communication network. This wireless connection typically extends from a few feet to a few miles. The communication network also includes or is coupled to a wired network. The base station can therefore continue or forward the communication using a wired connection over the wired network. The wired network can extend from dozens of feet to thousands of miles. If the other party is also using a mobile phone, the communication can be converted back to another wireless portion and routed to the other party using another wireless connection.

To provide voice, image, video, and other services, wireless networks are already expected to handle immense quantities of data with little to no appreciable delays. However, newer services are primed to demand even more from cellular and other wireless networks. Users will expect greater data bandwidth and even less delay, which is called latency, to accommodate such services. These new services include high-bandwidth applications like ultra-high definition (UHD) video that is delivered wirelessly from a streaming video service to a mobile device. Such services also include low-latency applications like autonomous-driving vehicles that communicate with each other to avoid accidents and that can therefore operate more safely if provided nearly instantaneous data communication capabilities. Some applications, like virtual reality (VR), will demand data delivery that provides a combination of both high-bandwidth and low-latency. Further, there is the ongoing development of the Internet of Things (IoT), which involves providing wireless communication capabilities to everything from medical devices to security hardware, from refrigerators to speakers, and to nearly ubiquitous sensors designed for safety and convenience. The deployment of IoT devices means hundreds of billions to trillions of new devices will soon be trying to communicate wirelessly.

Current 4G wireless networks are not expected to be able to handle the data bandwidth and latency targets for these new applications. Accordingly, to enjoy these new applications, new wireless technology is being developed. This Fifth Generation (5G) wireless network technology will adopt higher frequency EM waves (e.g., 6 GHz to 300 GHz for millimeter wave (mmW) wireless connections) to attain higher data bandwidth in conjunction with lower latency. These new applications and higher EM frequencies, however, introduce new and different challenges that are yet to be overcome by current wireless technologies.

For example, with the multitude of IoT devices that are coming on-line, the EM spectrum that is allocated to cellular wireless usage will be shared among many more wireless connection endpoints. Also, with the mmW EM signaling that will be used in some wireless networks, including 5G cellular networks, wireless signals are attenuated more quickly. More specifically, mmW EM signals are attenuated more quickly by air molecules and other environmental factors, such as humidity or physical obstructions, as compared to those signaling frequencies used in earlier generations of wireless networks. Consequently, mmW EM signals are incapable of traveling as far through the atmosphere before their quality is reduced to a level at which the information in the wireless signal is lost or otherwise becomes unusable. To address these issues, engineers and manufacturers are striving to create new wireless signaling technologies that can enable utilization of these GHz frequencies in a cellular or other wireless network, including those operating in accordance with a 5G wireless network standard.

This background description is provided to generally present the context of the disclosure. Unless otherwise indicated herein, material described in this section is neither expressly nor impliedly admitted to be prior art to the present disclosure or the appended claims.

SUMMARY

This summary is provided to introduce simplified concepts of fast beam tracking. The simplified concepts are further described below in the Detailed Description. Accordingly, this summary is not intended to identify essential features of the claimed subject matter nor is it intended for use in determining the scope of the claimed subject matter.

Methods and apparatuses for fast beam tracking are described. Using signal beams to communicate wirelessly can increase both spectrum usage efficiency and attainable signaling distances, especially at higher frequencies. To employ antenna beamforming, one wireless device can train a beamformer using a signal that is being received from another wireless device. The trained beamformer can then communicate with the other device via a signal beam, at least until changes to channel conditions render the trained beamformer ineffective. Movement by a user equipment, for instance, can cause such changes to channel conditions. Other causes of changing channel conditions include inclement weather and objects moving between a base station and the user equipment. If changes to the channel conditions are happening quickly, beamforming parameters can become stale equally quickly. Using stale beamforming parameters can result in a signal beam that is emanated by a base station failing to reach a user equipment.

In contrast, for example implementations, relatively fresh beamforming parameters are maintained. In conjunction with allocating a first air interface resource unit (e.g., an intersection of electromagnetic spectrum and elapsed time) for delivery of downlink data, a base station also reserves a second air interface resource unit for beamformer training. The second air interface resource unit is based on the first air interface resource unit. For example, their respective frequency ranges may be at least partially overlapping, and a second time for the second air interface resource unit may precede and be relatively proximate to a first time for the first air interface resource unit. In accordance with the second air interface resource unit, the user equipment transmits an uplink tracking communication to the base station for beamformer training purposes. Because reception and transmission operations are substantially reciprocal, a signal beam determined for a reception from the user equipment is likewise appropriate for a transmission to the user equipment. Accordingly, the base station then uses the recently-trained beamformer to transmit the downlink data via a signal beam in accordance with the first air interface resource unit. In these manners, beamforming parameters can be updated to be relatively fresh before each delivery of downlink data.

Aspects described below include a method for fast beam tracking as performed by a user equipment. The method includes receiving, from a base station, a downlink (DL) control channel communication including a DL data grant for the user equipment, with the DL data grant indicative of at least one first air interface resource unit allocated to the DL data grant. The method also includes, responsive to the DL data grant, transmitting to the base station via an uplink (UL) beam an UL tracking communication in accordance with at least one second air interface resource unit. The at least one second air interface resource unit is based on the at least one first air interface resource unit. The method further includes receiving, from the base station via a DL beam, a DL data channel communication corresponding to the DL data grant in accordance with the at least one first air interface resource unit, where the DL beam has been trained by the base station using the UL tracking communication.

Aspects described below include a user equipment (UE) for implementing fast beam tracking in a wireless system. The UE includes an antenna array and a wireless transceiver coupled to the antenna array. The UE also includes a processor and memory system configured to use the wireless transceiver and the antenna array to implement a fast beam-tracking manager. The fast beam-tracking manager is configured to receive from a base station a downlink (DL) control channel communication including a DL data grant for the user equipment, with the DL data grant indicative of at least one first air interface resource unit allocated to the DL data grant. The fast beam-tracking manager is also configured to, responsive to the DL data grant, transmit to the base station via an uplink (UL) beam an UL tracking communication in accordance with at least one second air interface resource unit. The at least one second air interface resource unit is based on the at least one first air interface resource unit. The fast beam-tracking manager is further configured to receive, from the base station via a DL beam, a DL data channel communication corresponding to the DL data grant in accordance with the at least one first air interface resource unit.

Aspects described below include a method for fast beam tracking as performed by a base station. The method includes transmitting to a user equipment a downlink (DL) control channel communication including a DL data grant for the user equipment, with the DL data grant indicative of at least one first air interface resource unit allocated to the DL data grant. The method also includes receiving from the user equipment an uplink (UL) tracking communication in accordance with at least one second air interface resource unit. The at least one second air interface resource unit is based on the at least one first air interface resource unit. The method additionally includes training for a DL beam using the UL tracking communication. The method further includes transmitting, to the user equipment via the DL beam, a DL data channel communication corresponding to the DL data grant in accordance with the at least one first air interface resource unit.

Aspects described below further include a system that may be realized as at least part of a user equipment. The system includes means for tracking a signal beam in an environment with a fast-changing channel condition. The means for tracking is configured to: receive, from a base station, a downlink (DL) control channel communication including a DL data grant for the user equipment, with the DL data grant indicative of at least one first air interface resource unit allocated to the DL data grant; responsive to the DL data grant, transmit to the base station via an uplink (UL) beam an UL tracking communication in accordance with at least one second air interface resource unit, with the at least one second air interface resource unit based on the at least one first air interface resource unit; and receive, from the base station via a DL beam, a DL data channel communication corresponding to the DL data grant in accordance with the at least one first air interface resource unit.

BRIEF DESCRIPTION OF THE DRAWINGS

Apparatuses of and techniques for implementing fast beam tracking are described with reference to the following drawings. The same numbers are used throughout the drawings to reference like features and components.

DETAILED DESCRIPTION

Overview

Figure 1:
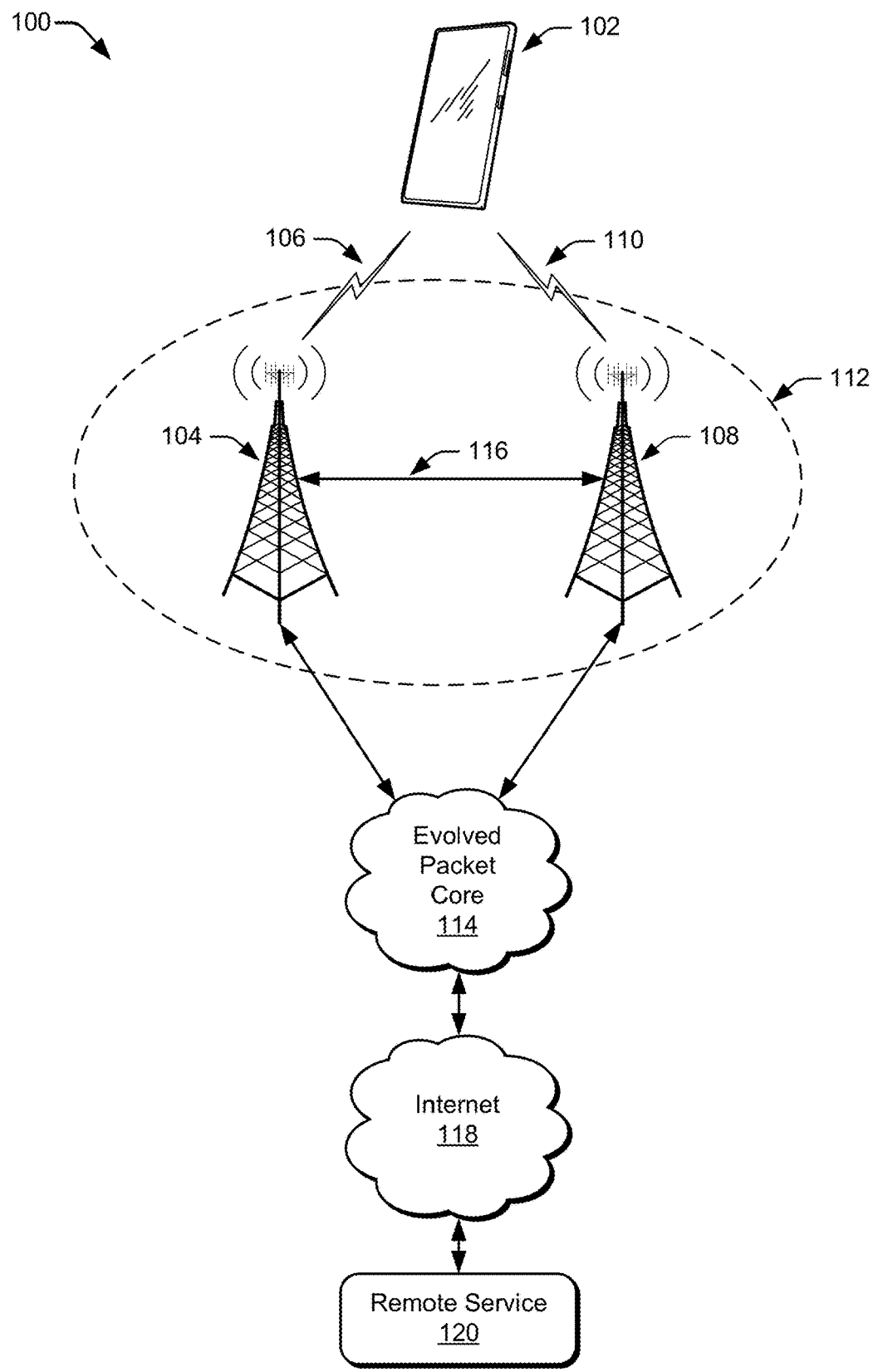
FIG. 1 illustrates an example wireless network environment in which different devices interoperate and can implement fast beam tracking.

Today, users can watch HD video, monitor social network feeds, and participate in video conferences using cellular wireless networks that operate in accordance with a 4G standard, such as LTE or LTE-Advanced. Soon, cellular wireless networks will be asked to handle newer applications that are technologically more difficult to provide to end users. Such applications may include watching ultra-HD (UHD) video or wirelessly coupling hundreds of billions more communication endpoints to the internet to support IoT devices. Such applications may also entail providing a safer sharing of the roadways by empowering self-driving vehicles or exchanging three-dimensional (3D) virtual reality (VR) data for games, professional training, and educational activities. To enable these newer applications, current cellular wireless networks are expected to be upgraded from 4G technology.

To upgrade from current 4G wireless networks, various goals have been established for next-generation 5G networks. These goals involve adopting higher electromagnetic (EM) frequencies for wireless signaling in 5G networks than are used in 4G networks. For example, instead of operating in the 100s of MHz to a few GHz like in 4G networks, 5G networks are expected to operate in the 10s of GHz (e.g., from 6 GHz to 300 GHz for mmW signaling). These higher frequencies offer some advantages, such as the potential for greater communication bandwidth in conjunction with lower latency. However, there are many challenges to working with these higher frequencies, and some of these challenges have yet to be met by the telecommunications industry. In other words, although a high-frequency goal has been established for 5G networks, the technology to reach this high-frequency destination with an efficient, feasible 5G wireless network has not yet been developed.

Thus, there are existing challenges for attaining a cost-effective, high-frequency wireless 5G network. For example, with the frequencies to be used for mmW signaling for 5G wireless networks, signal strength rapidly attenuates, or reduces, as an EM signal travels through the earth's atmosphere, especially in humid or wet weather. Consequently, the supportable distance between a transmitter and a receiver is reduced for mmW signals as compared to signals of larger wavelengths and lower frequencies. As another example, at some of these higher frequencies, EM signals are blocked by walls and relatively thin layers of metal. Antenna beamforming may at least partially address both these issues.

With antenna beamforming, an antenna array emanates a signal in a particular direction or in a particular pattern instead of omnidirectionally—i.e., instead of equally in all directions from a single antenna. This enables the resulting signal beam to be directed away from an object that might block a high-frequency EM signal. Moreover, the emanated power can be concentrated in a specific direction that extends from a transmitter in a direction that aims toward a receiver. Consequently, a signal transmitted at a given power level can travel farther through the air on a signal beam, even at the higher frequencies of mmW signals that attenuate more quickly in the earth's atmosphere.

Antenna beamforming offers another advantage: an increased or more-efficient sharing of the EM spectrum. By concentrating a first signal that is sent from a first transmitter to a first receiver in one direction, the first signal is less likely to cause interference in other directions. As a result, a second signal on the same frequency can be reused by a second transmitter and a second receiver in a spatial area that is close to that occupied by the first transmitter and receiver. This spatially-based frequency-reuse technique enables more devices to communicate wirelessly in a particular geographic region using a given frequency range allocation.

Antenna beamforming can therefore offer a number of advantages, including some that pertain specially to wireless communication with the mmW signals that are earmarked for 5G wireless networks. However, wireless communication with beamforming is more complicated than wireless communication without it. Without antenna beamforming, a transmitting device can simply emanate an EM signal omni-directionally and/or from one antenna element. With antenna beamforming, on the other hand, a transmitting device determines a direction at which to aim a beam of a signal; otherwise, the intended recipient device may not receive the signal beam. The determination of an appropriate direction for a signal beam is called antenna beamforming training.

This beamformer training can be accomplished in different manners, but each manner occupies some period of time, consumes air interface resources, and depletes resources such as battery power or processing bandwidth at the transmitting device and/or at the receiving device. Thus, although antenna beamforming is beneficial, it is inadvisable to constantly engage in beam training. However, beamforming parameters of a trained beamform cannot be effectively used indefinitely because they can eventually become stale. Further, a time over which the beamforming parameters grow stale becomes shorter if a channel condition between a base station and a user equipment is changing rapidly, and channel conditions can change rapidly if a user equipment is in motion. Thus, especially with rapidly-changing channel conditions, beamforming parameters can grow more and more stale until the corresponding signal beam is no longer effective at providing coverage to the targeted user equipment.

To address this problem, a base station and/or a user equipment in a wireless system is configured to maintain relatively fresh beamforming parameters in a manner that is responsive to the likely utilization of the fresh beamforming parameters. In some implementations, opportunities to train a beamformer are paired with the delivery of downlink (DL) data by scheduling a training period prior to the delivery of the DL data.

Thus, techniques and apparatuses are described for fast beam tracking. These techniques and apparatuses enable wireless communications to be made in environments that are hostile to signal propagation or with rapidly-moving devices. A respective fast beam-tracking manager at both a base station (BS) and a user equipment (UE) can interoperate to provide an uplink (UL) beam-tracking signal to facilitate beamforming on the downlink from the BS to the UE. The resulting beamforming enables a signal transmitted in a wireless system to travel farther in a targeted direction than a comparable signal would travel if transmitted omni-directionally. A signal beam is reciprocal and can therefore be aimed from one device to another device from both a transmission perspective and a reception perspective. For example, a BS can direct a signal beam toward a UE. To enable the BS to know how to direct a signal beam towards the UE, the UE can transmit a tracking signal toward the BS to train the beamforming of the BS. However, the beamforming information learned from the training can grow stale quickly if the UE is moving rapidly such that a directional beam no longer properly aims at the UE when the BS transmits another beamformed signal using the beamforming information.

To address this problem, in some implementations, a BS assigns an UL beam-tracking pilot channel (UBTPC) to a UE in association with a grant of a first air interface resource unit for a forthcoming DL data communication. The UBTPC is assigned frequency resources at a time that is prior to and proximate to the allocated first air interface resource unit to increase the likelihood that the beamforming information is still fresh when the first air interface resource unit is used for the DL data communication. For example, a BS communicates a DL data grant of at least one first air interface resource unit in a DL control channel communication, such as part of a Physical Downlink Control Channel (PDCCH). The DL data grant is for an allocation of some frequency range over a particular time period. The communication of the DL data grant implicitly or explicitly indicates an assignment of at least one second air interface resource unit for an UL tracking communication corresponding to the UBTPC.

In response to receiving the DL data grant communication, the UE transmits the UL tracking communication, which can include a pilot-tracking code, to the BS for the UBTPC in accordance with the assigned second air interface resource unit. The BS trains a beamform using the UBTPC to learn beamforming parameters to use to communicate with the UE on the DL. The BS then transmits a DL data channel communication, which can be part of a Physical Downlink Shared Channel (PDSCH), via a DL beam that is formed using the learned beamforming parameters. A temporal position assigned to the second air interface resource unit for the UL tracking communication can be indicated relative to the DL control channel communication or the DL data channel communication using a temporal offset. Alternatively, the temporal position for the tracking communication can be indicated by specifying a particular symbol, including a slot or frame that includes the particular symbol.

Example implementations in various levels of detail are discussed below with reference to the associated figures. The discussion below first sets forth an example operating environment and then describes example schemes, techniques, and hardware. Example methods are described thereafter with reference to various flow diagrams.

Example Environment

FIG. 1 illustrates an example environment 100 which includes a user equipment 102 (UE 102) that communicates with a base station 104 that acts as a serving cell (serving base station 104) through a wireless communication link 106 (wireless link 106). In this example, the user equipment 102 is depicted as a smartphone. Although illustrated as a smartphone, the user equipment 102 may be implemented as any suitable computing or electronic device, such as a mobile communication device, modem, cellular or mobile phone, mobile station, gaming device, navigation device, media or entertainment device, laptop computer, desktop computer, tablet computer, smart appliance, vehicle-based communication system, wearable computer, Internet of Things (IoTs) device, wireless interface for a machine, and the like. The base station 104 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, and the like, or any combination thereof.

The base station 104 communicates with the user equipment 102 via the wireless link 106, which may be implemented as any suitable type of wireless link. The wireless link 106 can include a downlink (DL) of data and control information communicated from the base station 104 to the user equipment 102, an uplink (UL) of other data and control information communicated from the user equipment 102 to the base station 104, or both. The wireless link 106 may include one or more wireless links or bearers implemented using any suitable communication protocol or standard, or combination of communication protocols or standards, such as 3rd Generation Partnership Project Long-Term Evolution (3GPP LTE), Fifth Generation New Radio (5G NR), and so forth.

In some aspects, the user equipment 102 communicates with another base station 104 (a neighbor base station 108) via a wireless link 110. The wireless link 110 may be implemented using the same communication protocol or standard as, or a different communication protocol or standard than, that of the wireless link 106. For example, the wireless link 106 can be implemented a 5G NR link while the wireless link 110 is implemented as an LTE link. The base station 104, the neighbor base station 108, and any additional base stations (not illustrated for clarity) collectively form a Radio Access Network 112 (RAN 112, Evolved Universal Terrestrial Radio Access Network 112, E-UTRAN 112), which is connected via an Evolved Packet Core 114 (EPC 114) network to realize a wireless operator network. The base station 104 and the neighbor base station 108 can communicate using an Xn Application Protocol (XnAP), as indicated at 116, to exchange user-plane and control-plane data. Using the Radio Access Network 112, the user equipment 102 may connect, via the Evolved Packet Core 114, to one or more public networks, such as the Internet 118, to interact with a remote service 120.

Example Wireless Devices

Figure 2:
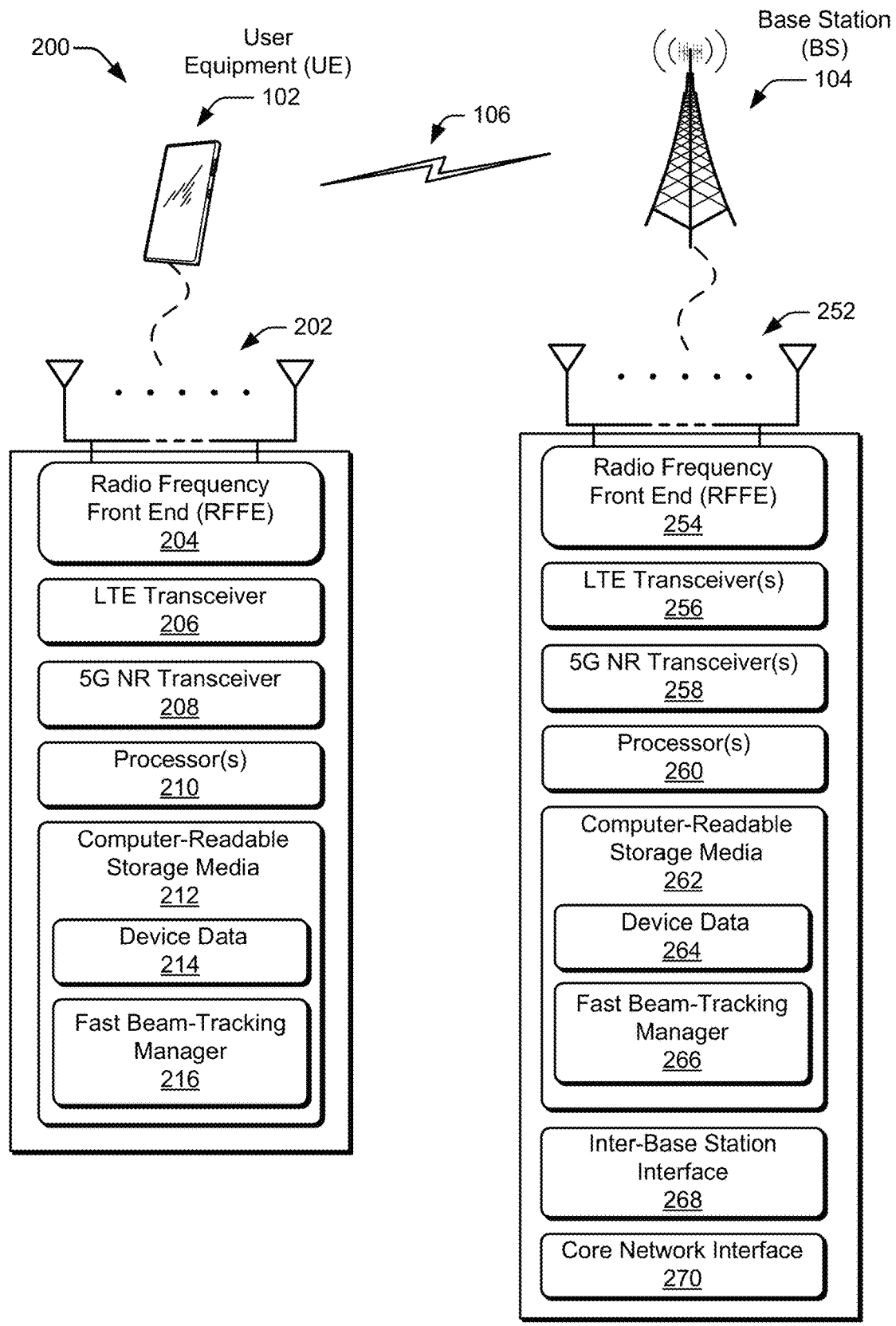
FIG. 2 is a schematic diagram illustrating example devices, such as a user equipment (UE) and a base station (BS), that can implement various aspects of fast beam tracking in a wireless network.

FIG. 2 is a diagram 200 illustrating example wireless devices, such as a user equipment (UE) 102 and a base station (BS) 104. The UE 102 and the base station 104 may include additional functions and interfaces that are omitted from FIG. 2 for the sake of clarity. The UE 102 includes antennas 202, at least one radio frequency front end 204 (RF front end 204), at least one LTE transceiver 206, and at least one 5G NR transceiver 208 for communicating with the base station 104. The RF front end 204 of the UE 102 can couple or connect the LTE transceiver 206 and the 5G NR transceiver 208 to the antennas 202 to facilitate various types of wireless communication. The antennas 202 of the UE 102 may include an array of multiple antennas that are configured similar to or differently from each other. The antennas 202 and the RF front end 204 can be tuned to, and/or be tunable to, one or more frequency bands defined by the 3GPP LTE or the 5G NR communication standards and implemented by the LTE transceiver 206 or the 5G NR transceiver 208, respectively. Additionally, the antennas 202, the RF front end 204, the LTE transceiver 206, and/or the 5G NR transceiver 208 may be configured to support beamforming for the transmission and reception of communications with the base station 104. Example approaches to beamforming are described below with reference to FIG. 4. By way of example and not limitation, the antennas 202 and the RF front end 204 can be implemented for operation in sub-gigahertz bands, sub-6 GHZ bands, and/or above-6 GHz bands that are defined by the 3GPP LTE and 5G NR communication standards.

The UE 102 also includes one or more processors 210 and computer-readable storage media 212 (CRM 212). The processor 210 may be a single core processor or a multiple core processor composed of a variety of materials, such as silicon, polysilicon, high-K dielectric, copper, and so on. The computer-readable storage media described herein excludes propagating signals. The CRM 212 may include any suitable memory or storage device, such as random-access memory (RAM), static RAM (SRAM), dynamic RAM (DRAM), non-volatile RAM (NVRAM), read-only memory (ROM), or Flash memory, useable to store device data 214 of the UE 102. The device data 214 includes user data, multimedia data, beamforming codebooks, applications, and/or an operating system of the UE 102. Applications (not explicitly shown) and the device data 214 are executable by the processor(s) 210 to enable user-plane communication, control-plane signaling, and user interaction with the UE 102.

The CRM 212 also includes a fast beam-tracking manager 216. Alternately or additionally, the fast beam-tracking manager 216 may be implemented in whole or part as hardware logic or circuitry integrated with or separate from other components of the UE 102. In at least some aspects, the fast beam-tracking manager 216 configures the RF front end 204, the LTE transceiver 206, and/or the 5G NR transceiver 208 to implement the techniques for fast beam tracking as described herein with regard to UEs, possibly in conjunction with other components, such as a communications processor or modem.

The base station 104, as shown in FIG. 2, can correspond to any of the example types of base stations set forth above or an equivalent thereof. The functionality of the base station 104 may be distributed across multiple network nodes or devices and may be distributed in any fashion suitable to perform the functions described herein. The base station 104 include antennas 252, at least one radio frequency front end 254 (RF front end 254), one or more LTE transceivers 256, and/or one or more 5G NR transceivers 258 for communicating with the UE 102. The RF front end 254 of the base station 104 can couple or connect the LTE transceivers 256 and the 5G NR transceivers 258 to the antennas 252 to facilitate various types of wireless communication. The antennas 252 of the base station 104 may include an array of multiple antennas that are configured similar to or differently from each other. The antennas 252 and the RF front end 254 can be tuned to, and/or be tunable to, one or more frequency bands defined by the 3GPP LTE and 5G NR communication standards and implemented by the LTE transceivers 256 and the 5G NR transceivers 258, respectively. Additionally, the antennas 252, the RF front end 254, the LTE transceivers 256, and/or the 5G NR transceivers 258 may be configured to support beamforming, such as massive multiple-input multiple-output (e.g., Massive-MIMO), for the transmission and reception of communications with the UE 102 or multiple UEs.

The base station 104 also includes one or more processors 260 and computer-readable storage media 262 (CRM 262). The processor 260 may be a single core processor or a multiple core processor composed of a variety of materials, such as silicon, polysilicon, high-K dielectric, copper, and so on. The CRM 262 may include any suitable memory or storage device, such as random-access memory (RAM), static RAM (SRAM), dynamic RAM (DRAM), non-volatile RAM (NVRAM), read-only memory (ROM), or Flash memory, useable to store device data 264 of the base station 104. The device data 264 includes network scheduling data, radio resource management data, beamforming codebooks, applications, and/or an operating system of the base station 104. Applications (not explicitly shown) and the device data 264 are executable by the processors 260 to enable communication with the UE 102.

The CRM 262 also includes a fast beam-tracking manager 266. Alternately or additionally, the fast beam-tracking manager 266 may be implemented in whole or part as hardware logic or circuitry integrated with or separate from other components of the base station 104. In at least some aspects, the fast beam-tracking manager 266 configures the RF front end 254, the LTE transceivers 256, and/or the 5G NR transceivers 258 to implement the techniques for fast beam tracking as described herein with regard to base stations, possibly in conjunction with other components, such as a communications processor or modem.

The base station 104 also includes an inter-base station interface 268, such as an Xn and/or X2 interface, as shown at 116 in FIG. 1. The inter-base station interface 268 can be used to exchange user-plane and control-plane data with another base station 108 (of FIG. 1) to manage communications between the base station 104 and the UE 102 with respect to the other base station 108, such as for handovers or cooperative bandwidth delivery. The base station 104 further includes a core network interface 270 to exchange user-plane and control-plane data with core network functions and entities, such as those of the Evolved Packet Core 114 of FIG. 1.

Example Approaches to Resource Allocation and Beamforming

Figure 3:
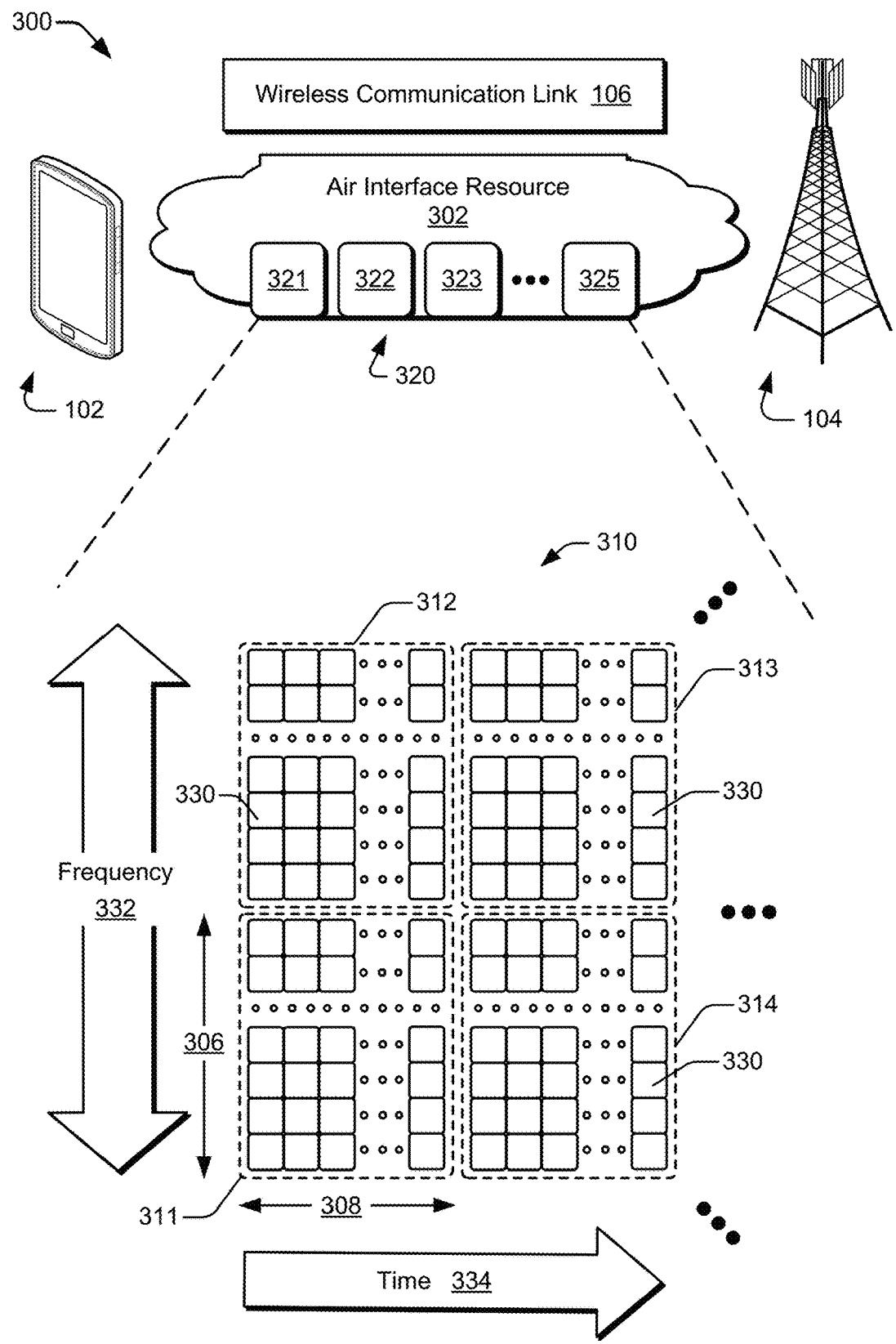
FIG. 3 illustrates an air interface resource that extends between a UE and a BS and with which various aspects of fast beam tracking can be implemented.

FIG. 3 illustrates an air interface resource 302 that extends between a user equipment 102 and a base station 104 and with which various aspects of fast beam tracking can be implemented. The air interface resource 302 can be divided into air interface resource units 320, including example resource units 321, 322, 323, . . . 325. Each air interface resource unit 320 occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 320 therefore includes at least one resource block 310. As shown, time 334 is depicted along the horizontal dimension as the abscissa axis, and frequency 332 is depicted along the vertical dimension as the ordinate axis. The air interface resource 302, as defined by a given communication protocol or standard, may span any suitable specified available frequency range, and/or may be divided into intervals of any specified duration. Increments of time can correspond to, for example, microseconds (µSec) or milliseconds (mSec). Increments of frequency can correspond to, for example, kilohertz (KHz) or megahertz (MHz).

In example operations generally, the base station 104 allocates portions (e.g., resource units 320) of the air interface resource 302 for uplink and downlink communications. Each resource block 310, such as a Physical Resource Block (PRB), of network access resources may be allocated to support a respective wireless communication link 106 corresponding to a particular user equipment 102. In the lower left corner of the grid, the resource block 311 may span, as defined by a given communication protocol, a specified frequency range 306 as a carrier and may include multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz).

The resource block 311 may also span, as defined by the given communication protocol, a specified time interval 308 or subframe or time slot (e.g., lasting approximately one millisecond with 14 orthogonal frequency-division multiplexing (OFDM) symbols at 15 kHz). The time interval 308 includes subintervals that may each correspond to a mini-slot of multiple symbols or to a symbol, such as an OFDM symbol. As shown in FIG. 3, each resource block 310 may include multiple resource elements 330 (REs) that correspond to, or are defined by, a subcarrier of the frequency range 306 and a subinterval (e.g., a symbol) of the time interval 308. Alternatively, a given resource element 330 may span more than one subcarrier in the frequency 332 domain or more than one symbol along the time 334 domain.

Thus, an air interface resource unit 320 may include at least one resource block 310, at least one resource element 330, and so forth.

In example implementations, multiple user equipments 102 (one of which is shown in FIG. 3) are communicating with the base station 104 through access provided by portions of the air interface resource 302 that the base station 104 allocates with air interface resource units 320. The fast beam-tracking manager 266 (as shown in FIG. 2) may determine a respective type or amount of information (e.g., data or control information) to be communicated (e.g., transmitted or received) by the user equipment 102. For example, the fast beam-tracking manager 266 may determine that the user equipment 102 is to receive a block of data on the downlink. This downlink can be realized as part of a downlink data channel, such as the Physical Downlink Shared Channel (PDSCH). The fast beam-tracking manager 266 then allocates at least one resource unit 320 to the user equipment 102 based on the determined amount or desired timing of the information. The fast beam-tracking manager 266 of the base station 104 can notify the user equipment 102 of the allocation using a downlink control channel, such as the Physical Downlink Control Channel (PDCCH). The fast beam-tracking manager 216 (of FIG. 2) of the user equipment 102 receives an indication of the resource unit allocation 320 and controls the user equipment accordingly. Example approaches to interactions and cooperative communications between the base station 104 and the user equipment 102 for fast beam-tracking are described herein.

Thus, portions—e.g., resource units 320—of the air interface resource 302 can be granted at a block level—e.g., using resource blocks 310. Additionally or in the alternative to block-level resource grants, the fast beam-tracking manager 266 may allocate resource units 320 at different levels, such as at an element-level. Accordingly, the fast beam-tracking manager 266 may allocate one or more resource elements 330 or individual subcarriers to different user equipments 102. By so doing, one resource block 310 can be allocated to facilitate network access for multiple user equipments 102. Generally, the fast beam-tracking manager 266 may allocate, at various granularities, one or up to all subcarriers or resource elements 330 of a resource block 310 to one user equipment 102 or divided across multiple user equipments 102, thereby enabling higher network utilization or increased spectrum efficiency. The air interface resource 302 can also be used to transmit from the user equipment 102 and to receive at the base station 104 UL tracking communications, which are described below starting at FIG. 6.

The fast beam-tracking manager 266 can therefore allocate air interface resource 302 by resource unit 320, resource block 310, frequency carrier, time interval, resource element 330, frequency subcarrier, time subinterval, frame or slot, symbol, spreading code, some combination thereof, and so forth. Based on respective allocations of resource units 320, the fast beam-tracking manager 266 can transmit respective messages or other communications to the multiple user equipments 102 indicating the respective allocation of resource units 320 to each user equipment 102. Each communication indicative of at least one allocated resource unit 320 may enable a respective user equipment 102 to queue the information or configure the LTE transceiver 206, the 5G NR transceiver 208, or both to communicate via the allocated resource units 320 of the air interface resource 302. For example, the user equipment 102 can prepare an antenna beamformer to steer a signal beam toward the base station 104. To do so, the user equipment 102 can train the beamformer responsive to receipt of a signal transmitted from the base station 104. Beamforming is described next with reference to FIG. 4.

Figure 4:
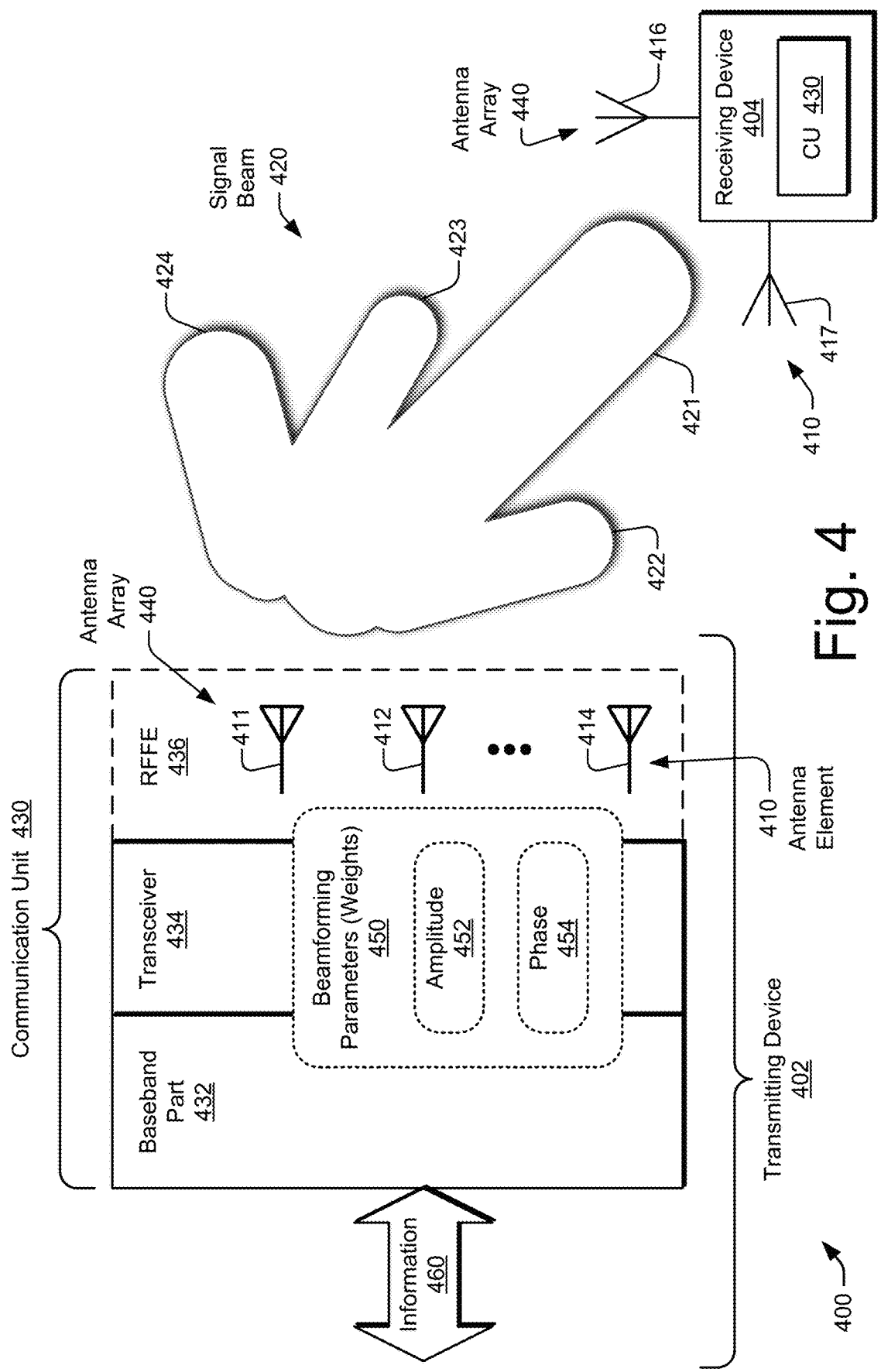
FIG. 4 illustrates an example of a communication unit for a wireless device in which the communication unit can implement beamforming to generate signal beams for transmission or reception functionality.

FIG. 4 illustrates an example beamforming scenario 400 including a transmitting device 402 and a receiving device 404. The transmitting device 402 includes an example of a communication unit 430 that is configured to implement antenna beamforming to generate multiple signal beams 420. As shown, the communication unit 430 can transmit multiple signal beams 420, examples of which include four signal beams 421, 422, 423, and 424; however, more or fewer signal beams 420 can be generated. In this example, the multiple signal beams 420 are formed such that a first signal beam 421 extends farther in a particular direction than the other signal beams. After training as described below, the communication unit 430 of the transmitting device 402 can aim the first signal beam 421 in a direction toward the receiving device 404.

In some situations, a user equipment 102 (e.g., of FIGS. 1-3) functions as the transmitting device 402, and a base station 104 functions as the receiving device 404. In other situations, the base station 104 functions as the transmitting device 402, and the user equipment 102 functions as the receiving device 404. Thus, in the former situations, the communication unit 430 of the transmitting device 402 corresponds to the user equipment 102, but the communication unit 430 of the transmitting device 402 corresponds to the base station 104 in the latter situations.

The communication unit 430 is configured to transmit information 460 (e.g., data or control information) or receive information 460. The communication unit 430 includes a baseband (BB) part 432, a radio frequency (RF) transceiver 434 (e.g., a transmitter and/or a receiver), and an RF front end (RFFE) 436. The RFFE 436 includes an antenna array 440 that includes multiple antenna elements 410, examples of which are antenna elements 411, 412, . . . 414. Thus, the multiple antenna elements 410 may jointly form or function as the antenna array 440. Generally, as used herein, an "antenna" may refer to an antenna array or an antenna element. An RF signal that is transmitted from different ones of the multiple antenna elements 411, 412, . . . 414 constructively and destructively combine at different physical or geospatial locations to create multiple signal beams 420 that provide different spatial patterns for the resulting signal beams 420. In addition to direction, each signal beam 420 can have a different height, shape along the beam, width, shape of incidence on the earth's surface, length, and so forth.

In some implementations, the baseband part 432 includes at least one baseband processor to modulate or apply the information 460 to a baseband signal as part of a transmission operation. The transceiver 434 includes one or more lowpass filters and processes the baseband signal to upconvert or down-convert the frequency using at least one mixer for transmission or reception operations, respectively. The RFFE 436, in addition to the multiple antenna elements 410, includes one or more bandpass filters. The transceiver 434 or the RFFE 436 also includes one or more low-noise amplifiers (LNAs) for receiving signals and one or more power amplifiers (PAs) for transmitting signals. The transceiver 434 or the RFFE 436 can include one or more phase shifters to delay a signal in time or change a phase thereof.

The communication unit 430 generates different patterns for the signal beams 420 by adjusting one or more beamforming parameters 450. The beamforming parameters 450 can also be referred to as beamforming weights. The beamforming parameters 450 establish different amplitudes 452, phases 454, and so forth for each signal version that is provided to one of the multiple antenna elements 410. By changing aspects of the signals emanating from the multiple antenna elements 410, the manners and geospatial locations at which the RF signals interact change, which produces different signal beam patterns.

Beamforming parameters 450 can be implemented at any portion of the communication unit 430. For example, the baseband part 432 can implement beamforming parameters 450 using precoding at a baseband processor. The transceiver 434 or the RFFE 436 can implement beamforming parameters 450 using, for instance, phase shifters to shift the phase of one signal version relative to that of other signal versions. Alternatively, a hybrid approach can be implemented in which beamforming parameters 450 are established partially at the baseband part 432 and partially at the transceiver 434 or the RFFE 436.

As shown in FIG. 4, the receiving device 404 also includes a communication unit (CU) 430. The receiving device 404 can therefore use the communication unit 430 to transmit or receive beamformed signals. Further, although the communication unit 430 of the transmitting device 402 is described above primarily in terms of transmitting a signal beam 420, each communication unit 430 can also receive signals using antenna beamforming. In other words, the inverse or reciprocal beamforming process can be implemented by the receiving device 404 to increase a sensitivity to propagating EM signals using signal beams 420. To do so, the communication unit 430 at the receiving device 404 receives multiple RF signals or signal versions at multiple antenna elements 410, such as antenna elements 416, 417, and processes the multiple RF signal versions using different beamforming parameters 450 until a received signal beam 420 is detected that has a sufficiently strong signal.

This process of searching for beamforming parameters 450 that are at least acceptable for receiving a signal beam 420 is called training the communication unit 430 to receive the signal beam 420 or training the beamformer. A beamforming training module (not separately shown) of a user equipment 102 or a beamforming training module of a base station 104 can implement beamforming training Because RF propagation is at least partially reciprocal in nature, the beamforming parameters 450 that are determined as part of a receive operation at the receiving device 404 can be used for transmission as well when that device becomes the transmitting device. In other words, beamforming parameters 450 that are good for receiving a signal beam 420 from one device can then be used for transmitting another signal beam 420 back to that device. Similarly, beamforming parameters 450 that have been confirmed as being good for transmitting can be used for receiving, as long as channel conditions have not appreciably changed.

Thus, antenna beamforming during transmission to a given device can train the beamformer (e.g., by determining appropriate beamforming parameters 450) for subsequent reception from the given device, and antenna beamforming during reception from the given device can train the beamformer for subsequent transmission to the given device. Training a beamformer by receiving a communication on a signal beam to determine beamforming parameters 450 can therefore increase a quality of a subsequent transmission, as long as the beamforming parameters 450 remain fresh. This is especially pertinent if the transmitting or receiving device is moving or the signal propagation channel is otherwise rapidly changing. Fast beam tracking as described herein can therefore be used to enhance beamforming by helping to train a beamformer as channel conditions change (e.g., because the location of at least one device that is party to a communication is moving). For example, a beamformed signal received at a base station from a given user equipment helps to train the beamformer at the base station for sending a signal beam back to the given user equipment. This situation is depicted in FIG. 5.

Example Schemes, Devices, and Components

Figure 5:
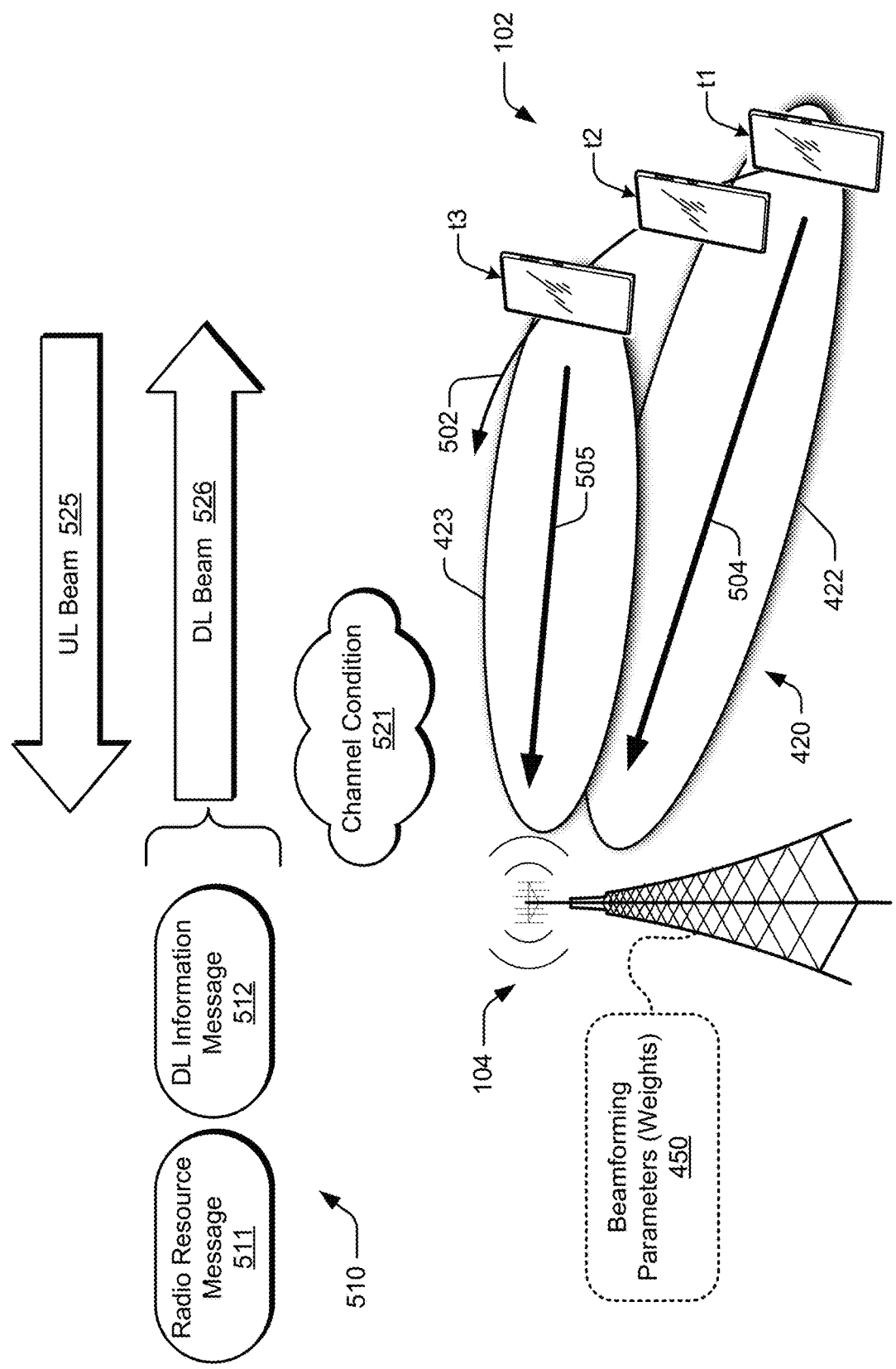
FIG. 5 illustrates an example beamforming environment for implementing fast beam tracking between two wireless devices, such as a BS and a UE.

FIG. 5 illustrates an example beamforming environment 500 for implementing fast beam tracking between two wireless devices, such as a base station 104 and a user equipment 102. The user equipment 102 and the base station 104 can communicate using one or more signal beams 420, as described above with reference to FIG. 4. Two additional examples of a signal beam are an uplink beam 525 (UL beam 525) and a downlink beam 526 (DL beam 526). Messages 510 can be communicated on the uplink or the downlink. Two example message types that can be communicated via a DL beam 526 are depicted in FIG. 5. These are a radio resource message 511 and a DL information message 512.

In some implementations, the radio resource message 511 is transmitted by the base station 104 to multiple user equipments 102 to disseminate general system or cell-level information that is applicable to multiple user equipments 102. In contrast, the DL information message 512 is transmitted by the base station 104 to as few as a single user equipment 102 to provide device-specific information for interacting with the base station 104. In some aspects, a radio resource message 511 can be implemented as a Radio Resource Control (RRC) message, and a DL information message 512 can be implemented as a Downlink Control Information (DCI) message.

As shown in FIG. 5, a channel condition 521 represents different traits or characteristics realizing or impacting a wireless communication between the user equipment 102 and the base station 104. Examples of factors related to the channel condition 521 include: weather or atmospheric conditions, other (potentially-interfering) wireless signals, objects located between the two devices or along a path of a signal propagating between the two devices, movement of such objects, translational movement of the user equipment 102 that changes a location thereof, rotational movement of the user equipment 102 that changes an orientation thereof, combinations thereof, and so forth. If changes to any one or more of these characteristics change the channel condition 521, the beamforming between the two devices can be impacted.

Consider, for instance, translational movement of the user equipment 102. At time t1, the user equipment 102 transmits an uplink (UL) communication 504, which may be transmitted via a beamformed signal, to the base station 104. By receiving the UL communication 504, the base station 104 can train its beamforming mechanism to learn one or more beamforming parameters 450, as is described above with reference to FIG. 4. Using these beamforming parameters 450, the base station 104 can then transmit a signal beam 4220 (e.g., as a DL beam 526) back to the user equipment 102 as some DL communication. As shown in FIG. 5, the signal beam 422 is well-aimed at the user equipment 102 at time t1. In this situation, the DL data transmitted to the user equipment 102 via the signal beam 422 is ordinarily received successfully.

The user equipment 102, however, is in motion along a path 502. At time t2, the user equipment 102 has started to leave a location covered by the signal beam 422. Consequently, the DL data transmitted to the user equipment 102 via the signal beam 422 at time t2 may still be received, but possibly with a lower bandwidth or accuracy level. At time t3, however, the user equipment 102 has traveled farther along the path 502. As depicted in this example, the user equipment 102 has departed the area covered by the signal beam 422 at time t3. As a result, the DL data transmitted to the user equipment 102 via the signal beam 422 at time t3 is unlikely to be received, at least at a satisfactory level of quality. Thus, a user equipment 102 that is in motion can "outrun" an unchanging or static signal beam 422 relatively quickly, which reduces communication throughput or bandwidth.

To counteract this situation, in some implementations the user equipment 102 transmits an UL communication 505 around time t3 but prior to a time at which the base station 104 is scheduled to transmit DL data via a signal beam 423. The base station 104 can therefore learn beamforming parameters 450 from the UL communication 505 at time t3 and use the learned beamforming parameters 450 to form an appropriately-shaped and directed signal beam 423 for a DL data communication. If the time interval between the UL communication 505 used for beamform training and the subsequent transmission of the signal beam 423 (e.g., as a DL beam 526) used for DL data delivery is sufficiently small, the likelihood of the user equipment 102 being present within a coverage area of the signal beam 423 increases appreciably. Example approaches to allocating portions of the air interface resource 302 of FIG. 3 to this end (e.g., scheduling UL communications) are described below for fast beam tracking. Although some of the description herein focuses on a movement of the user equipment 102 causing changes to the channel condition 521, the described principles are applicable to counteracting changes to the channel condition 521 from other causes.

Figure 6:
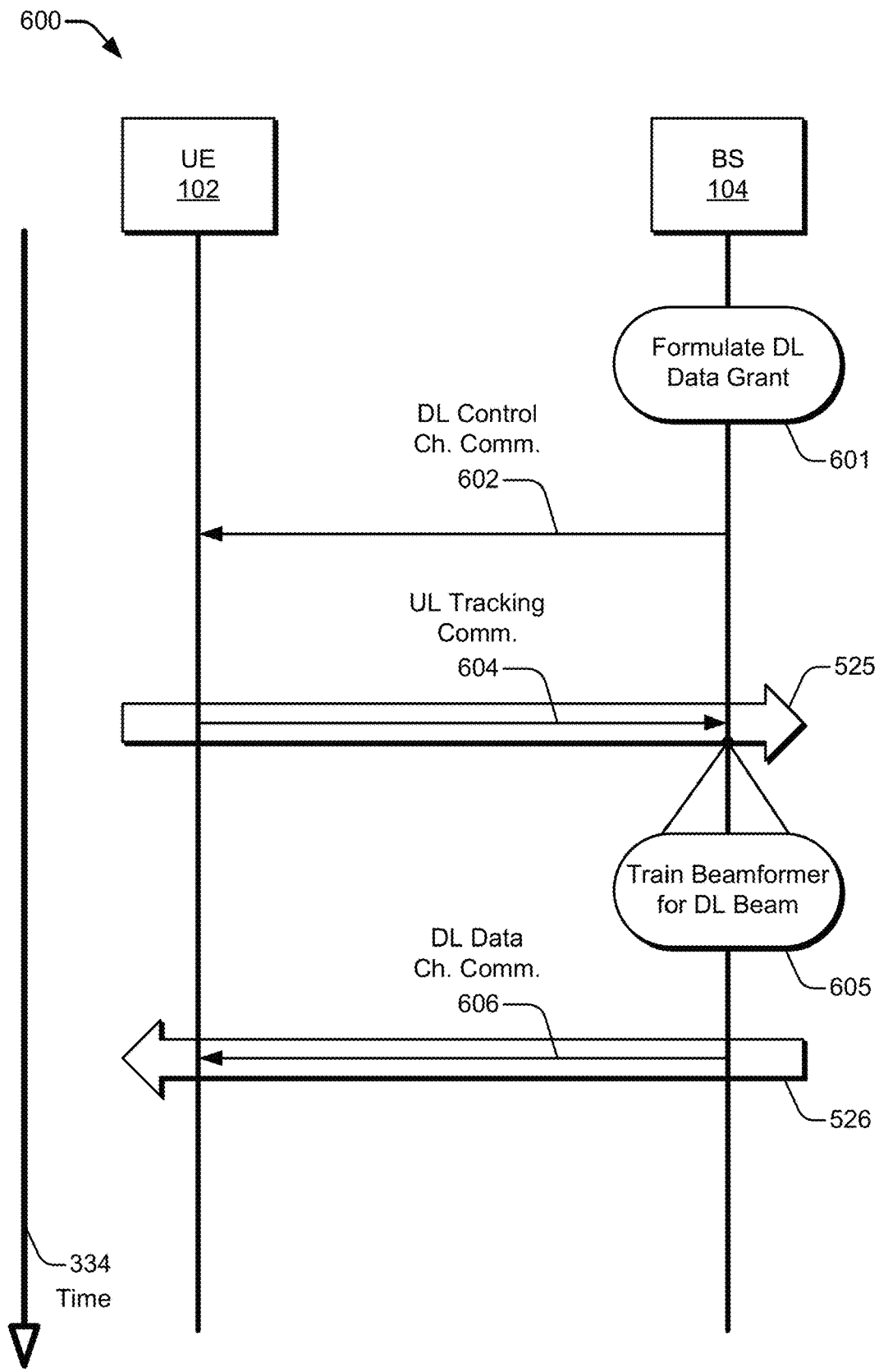
FIG. 6 is a sequence diagram illustrating examples of operations and multiple communications between a BS and a UE to implement fast beam tracking in accordance with a wireless signaling protocol.

FIG. 6 is a sequence diagram 600 illustrating examples of operations and multiple communications between a base station 104 and a user equipment 102 to implement fast beam tracking in accordance with a wireless signaling protocol. The operations or communications can be performed by a fast beam-tracking manager 216 (as shown in FIG. 2) of the user equipment 102 or by a fast beam-tracking manager 266 of the base station 104. In the example sequence diagram 600, time 334 increases in a downward direction. Three examples of communication exchanges that relate to fast beam tracking are shown: a downlink (DL) control channel communication 602, an uplink (UL) tracking communication 604, and a downlink (DL) data channel communication 606.

In example implementations, the base station 104 is responsible for allocating portions of the air interface resource 302 (of FIG. 3) to the various user equipments in a cell or other area that is associated with the base station 104. Accordingly, at an operation 601, the base station 104 formulates a DL data grant for the user equipment 102 responsive to receipt at the base station 104 of DL data that is destined for the user equipment 102. The DL data grant corresponds to at least one first air interface resource unit 321 (e.g., of FIGS. 3, 7, and 8).

The base station 104 transmits to the user equipment 102 the DL control channel communication 602 including a DL data grant for the user equipment 102. The DL control channel communication 602 may be implemented using, for example, a Physical Downlink Control Channel (PDCCH). The DL data grant is indicative of the at least one first air interface resource unit 321 allocated to the DL data grant. The first air interface resource unit 321 allocated to the DL data grant may correspond to a portion of, for example, a Physical Downlink Shared Channel (PDSCH). Thus, the user equipment 102 receives from the base station 104 the DL control channel communication 602 including the DL data grant for the user equipment 102. The user equipment 102 is therefore informed of the at least one first air interface resource unit 321 that is allocated to it. The first air interface resource unit 321 can correspond to an allocated frequency range and allocated time for the DL data communication.

Figure 7:
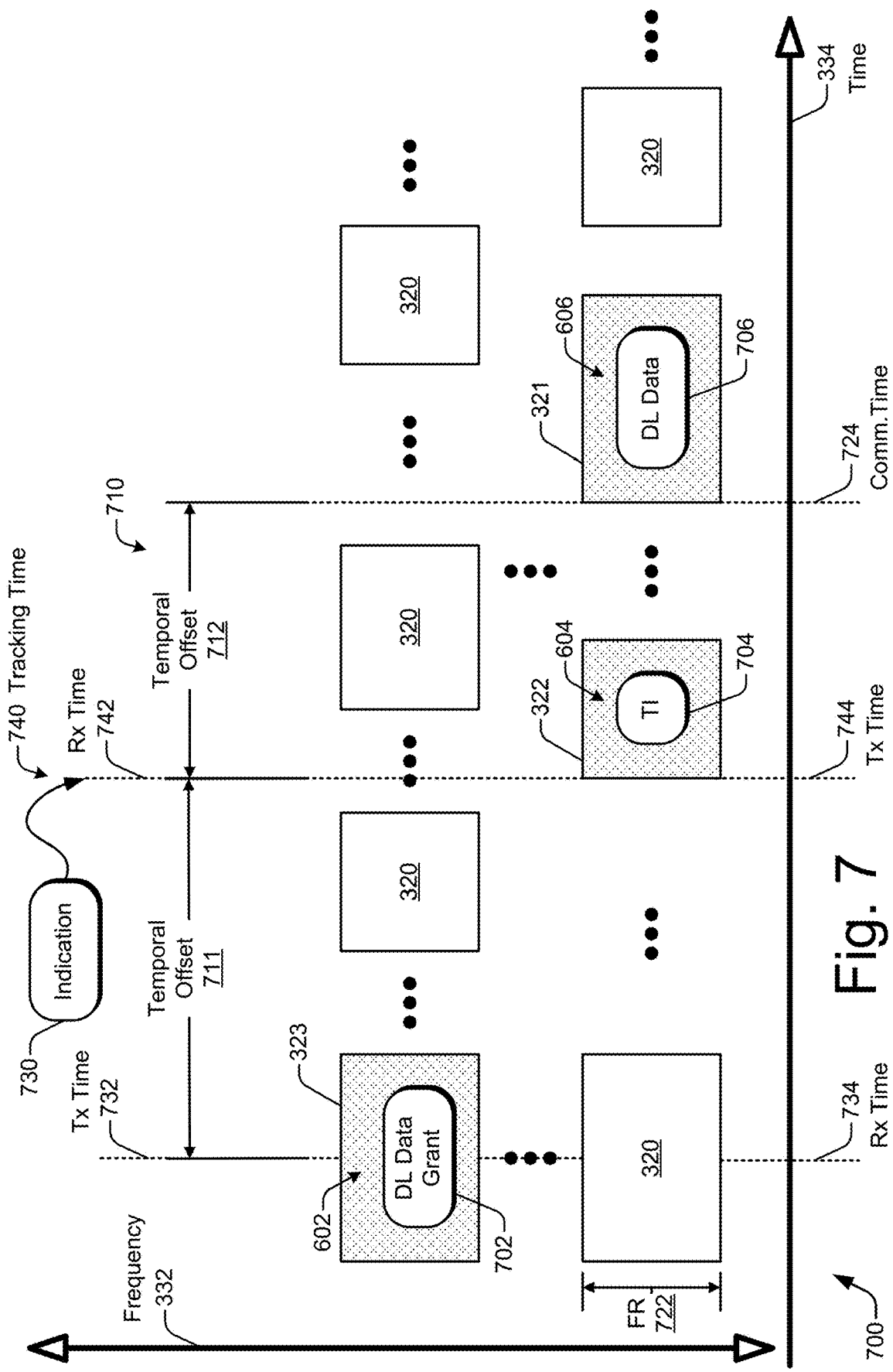
FIG. 7 illustrates, for a portion of an air interface resource, an example scheduling of communications to implement fast beam tracking.
Figure 8:
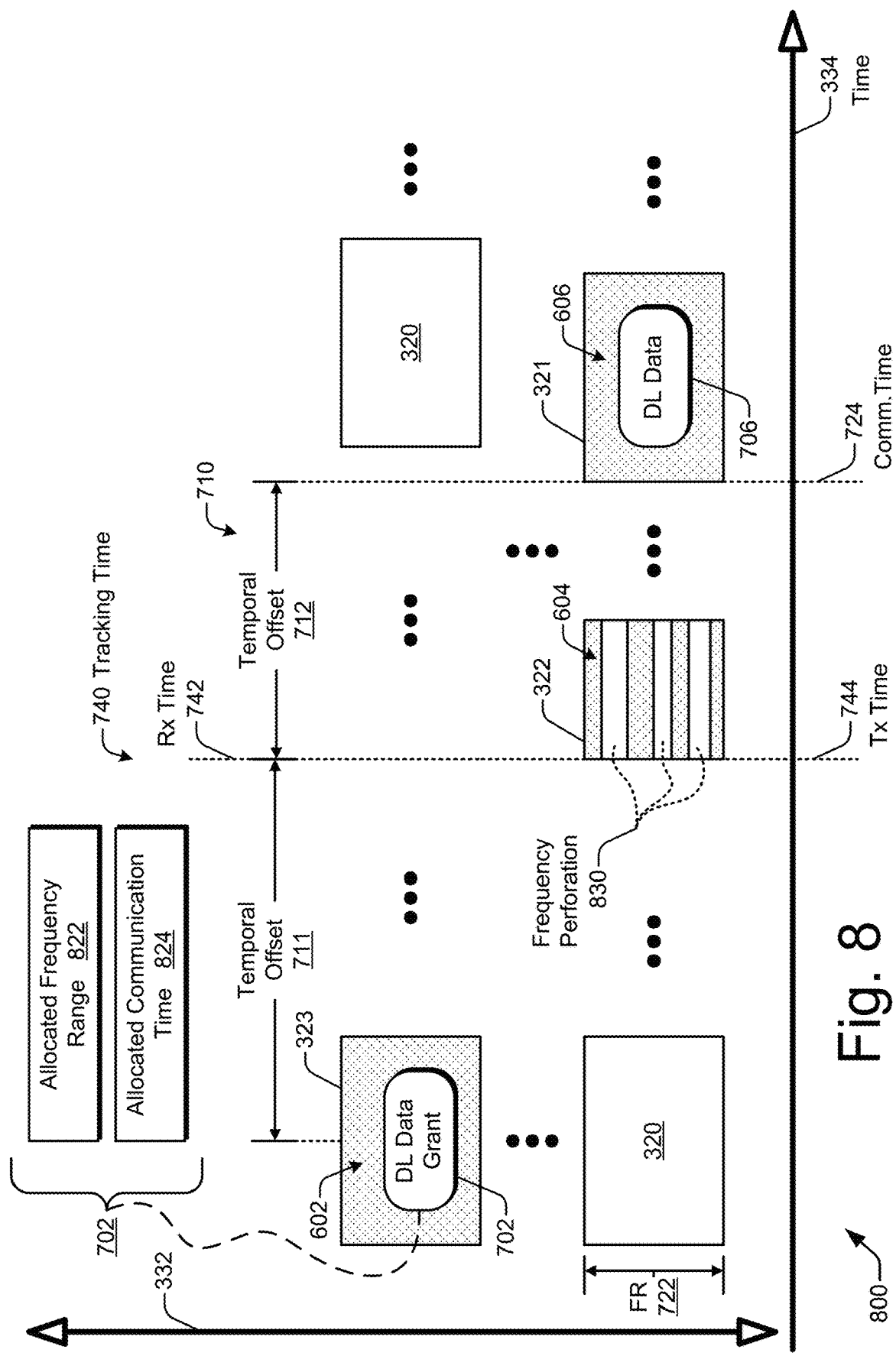
FIG. 8 illustrates, for a portion of an air interface resource, other example aspects for implementing fast beam tracking.

Responsive to the DL data grant, the user equipment 102 transmits to the base station 104 the UL tracking communication 604 via an UL beam 525 and in accordance with at least one second air interface resource unit 322 (e.g., of FIGS. 3, 7, and 8). The UL tracking communication 604 may be implemented using, for example, a channel designated to include beam-tracking information, such as an UL beam-tracking pilot channel (UBTPC). The at least one second air interface resource unit 322 for the UL tracking communication 604 is based on the at least one first allocated air interface resource unit 321. For example, the UL tracking communication 604 can be communicated over a frequency that at least overlaps the allocated frequency range of the first air interface resource unit 321 or at a time that is shortly prior to and proximate to the allocated time for the DL data communication. The base station 104 receives from the user equipment 102 the UL tracking communication 604 via the UL beam 525 (e.g., using the UBTPC) in accordance with the second air interface resource unit 322. The UL tracking communication 604 may include beam-tracking information, such as a pilot sequence known to the base station 104. At an operation 605, the base station 104 trains for a DL beam using the UL tracking communication 604. For example, the base station 104 can learn one or more beamforming parameters 450 that are currently appropriate for beam-based communication with the user equipment 102 using the UL tracking communication 604 by searching for a known pilot signal over a set of different beamforming parameters 450.

After the beamforming training is at least partially performed, the base station 104 transmits to the user equipment 102 the DL data channel communication 606 via a DL beam 526 (e.g., using the PDSCH). The DL beam 526 is formed using the beamforming parameters 450 learned during reception of the UL tracking communication 604. The DL data channel communication 606 includes the DL data corresponding to the DL data grant and is transmitted in accordance with the at least one first air interface resource 321—e.g., at the allocated frequency range and the allocated communication time. The user equipment 102 receives from the base station 104 the DL data channel communication 606 via the DL beam 526 (e.g., using the PDSCH) in accordance with the at least one first air interface resource unit 321. Because the DL beam 526 is generated relatively recently after beamformer training and there is less time for changes to the channel condition 521, the user equipment 102 has a greater likelihood of successfully receiving the DL data included in the DL data channel communication 606, as compared to if more time had elapsed between beamformer training and DL data transmission.

FIG. 7 illustrates, for a portion 700 of an air interface resource 302, an example scheduling of communications to implement fast beam tracking. The portion 700 includes multiple air interface resource units 320. As represented by the ellipses, any amount of time or any range of frequency (including as little as none for either or both) can occur before, between, or after the explicitly-depicted air interface resource units 320. Three specific air interface resource units 321, 322, and 323 are depicted for the following communications. The DL control channel communication 602, such as a PDCCH, is propagated in accordance with a third air interface resource unit 323. The UL tracking communication 604, such as a UBTPC, is propagated in accordance with a second air interface resource unit 322. The DL data channel communication 606, such as a PDSCH, is propagated in accordance with a first air interface resource unit 321. As shown, the DL control channel communication 602 includes a DL data grant 702, the UL tracking communication 604 includes tracking information 704 (TI 704), and the DL data channel communication 606 includes DL data 706.

In some implementations, the first air interface resource unit 321 for the DL data channel communication 606 corresponds to a frequency range 722 (FR 722) and a communication time 724. Thus, the base station 104 transmits the DL data 706 to the user equipment 102 over the frequency range 722 and at the communication time 724 in accordance with the first air interface resource unit 321 specified in the DL data grant 702. The DL beam used to transmit the DL data channel communication 606 can be trained using the previously-exchanged UL tracking communication 604. The tracking information 704 enables a receiving device (e.g., a base station 104) to focus or direct a signal beam by searching for the tracking information 704. Accordingly, the tracking information 704 can include any information that is known or determinable by both the transmitting and receiving devices involved in a training operation. The tracking information 704 can include, for example, a pilot-tracking code (e.g., a bit sequence) assigned to each user equipment 102 by the base station 104.

Relative to the user equipment 102, the UL tracking communication 604 has a transmission time 744. Relative to the base station 104, the UL tracking communication 604 has a reception time 742. However, the transmission time 744 and the reception time 742 correspond to a same time along the time dimension 334 (discounting signal propagation time), and these times are jointly denoted as a tracking time 740. Similarly, relative to the base station 104, the DL control channel communication 602 has a transmission time 732. And relative to the user equipment 102, the DL control channel communication 602 has a reception time 734. Depending on implementation, any of these times can correspond to a beginning, an end, a middle, and so forth of a given communication or corresponding air interface resource unit 320, as long as the wireless devices are operating under a common understanding.

In some aspects, the base station 104 provides an indication 730 of a tracking time 740 that is associated with the UL tracking communication 604 and corresponds to the second air interface resource unit 322. As noted above, the tracking time 740 corresponds to the transmission time 744 for the user equipment 102 and to the reception time 742 for the base station 104. The indication 730 can be provided in any one or more of multiple formats or mechanisms. For example, the indication 730 can identify a particular symbol or slot position for the UL tracking communication 604. Alternatively, the indication 730 can include a temporal offset 710, such as a temporal offset 711 or 712. The temporal offset 710 is an indication that is relative to another time, such as a time of the DL control channel communication 602 or the DL data channel communication 606, with the latter corresponding to the allocation provided by the DL data grant 702. Thus, the tracking time 740 can be determined using either temporal offset 711 or temporal offset 712. As shown in FIG. 7, the tracking time 740 (e.g., the reception time 742 and the transmission time 744) can be determined using the temporal offset 711 relative to the DL control channel communication 602 (e.g., relative to the transmission time 732 or the reception time 734 thereof) or can be determined using the temporal offset 712 relative to the DL data channel communication 606 (e.g., relative to the communication time 724 thereof).

The indication 730 can be provided implicitly or explicitly. For example, for a semi-static interval for multiple user equipments 102, the base station 104 can establish the temporal offset 710 or other indication 730 using a radio resource message 511. For dynamically adjusted intervals for as few as a single user equipment 102, the base station 104 can configure the tracking time 740 for each user equipment 102 by providing the temporal offset 710 or other indication 730 using a DL information message 512.

The base station 104 can select the tracking time 740 to facilitate having fresh beamforming parameters 450 at the start of the DL data channel communication 606. Thus, the tracking time 740 can be selected such that an end of the UL tracking communication 604 and the beginning of the DL data channel communication 606 has a desired duration. The desired duration may vary based on a rate at which the channel condition 521 is changing. If the channel condition 521 is changing rapidly, the desired duration between the two communications can be reduced. Moreover, if the channel conditions 521 are changing slowly, the use of UL tracking communications 604 can be disabled, as is explained with reference to FIG. 9.

FIG. 8 illustrates, for a portion 800 of an air interface resource 302, other example aspects for implementing fast beam tracking. As shown, the DL data grant 702 can include or correspond to an allocated frequency range 822 and an allocated communication time 824 for delivery of the DL data 706 as part of the DL data channel communication 606. The DL data grant 702 can therefore inform the user equipment 102 of the allocated first air interface resource unit 321 for the DL data channel communication 606. Here, the allocated communication time 824 corresponds to the communication time 724, and the allocated frequency range 822 corresponds to the frequency range 722.

As illustrated, the DL data 706 of the DL data channel communication 606 may occupy each subcarrier of the frequency range 722 as per the DL data grant 702. Generally, the UL tracking communication 604 propagates on a frequency band that is at least proximate to that of the DL data channel communication 606 to facilitate accurate beamforming because channel conditions 521 can vary by frequency. More specifically, the UL tracking communication 604 can have a frequency that at least overlaps the frequency range 722 of the DL data channel communication 606. Thus, the UL tracking communication 604 need not occupy each subcarrier of the frequency range 722 to provide useful beam training. Instead, the UL tracking communication 604 can cover a frequency perforation 830 of the frequency range 722. Implementing a frequency perforation 830 across the frequency range 722 can be more spectrally efficient, if the unoccupied subcarriers are allocated to other user equipments. This frequency perforation 830 corresponds to covering some, but not all, subcarriers of the frequency range 722. For example, the frequency perforation 830 can cover the two outer subcarriers and at least one inner subcarrier, can cover every other subcarrier, and so forth.

Figure 9:
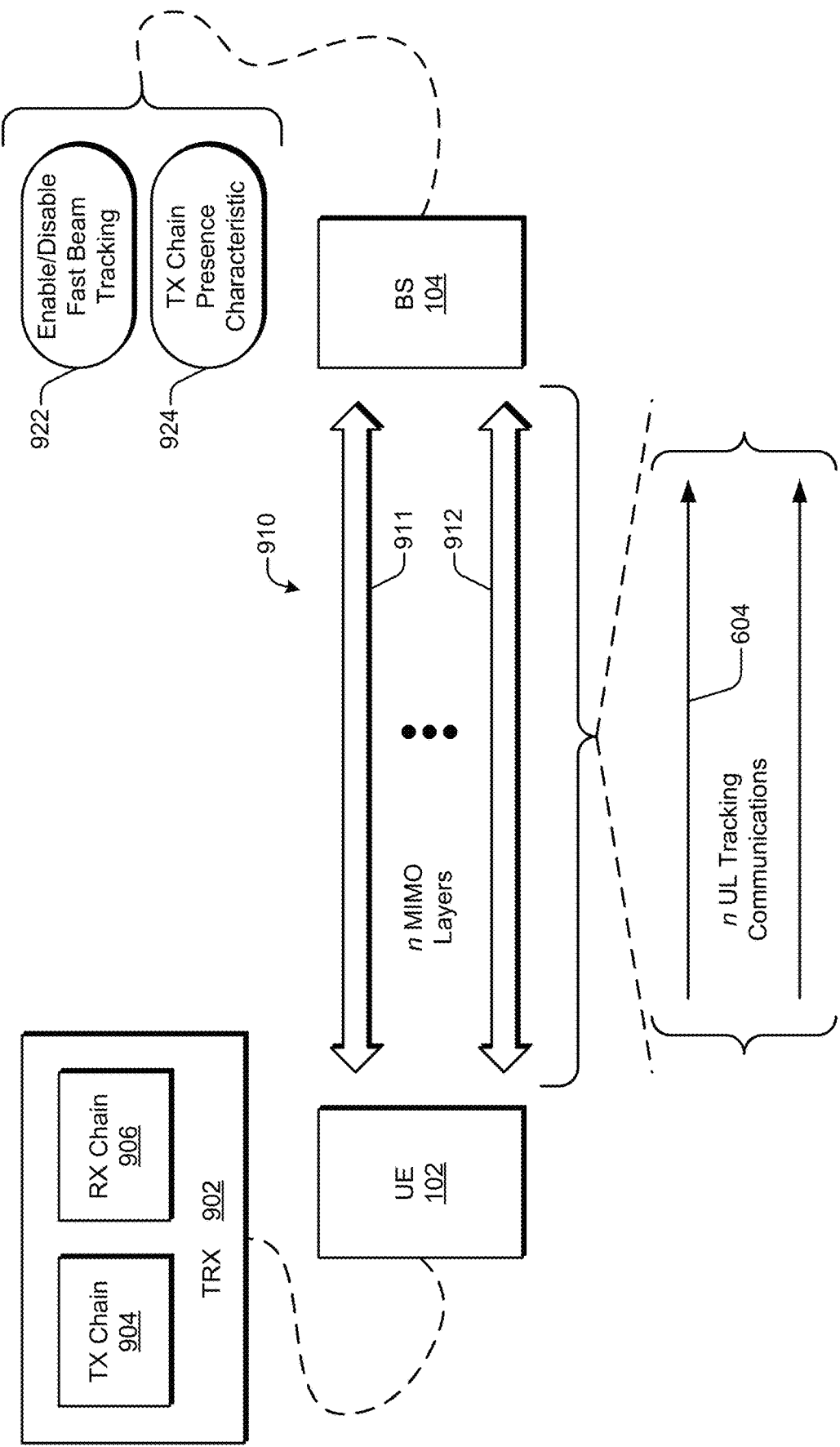
FIG. 9 illustrates an example multiple-input, multiple-output (MIMO) environment in which fast beam tracking can be implemented.

FIG. 9 illustrates an example multiple-input, multiple-output (MIMO) environment in which fast beam tracking can be implemented. In some cases, a communication unit 430 (of FIG. 4) includes or is coupled to multiple transceivers and multiple antenna arrays that are configured to establish and manage multiple different wireless links in an overlapped or substantially-simultaneous manner. This technique is referred to as a multiple-input, multiple-output (MIMO) operation of a wireless device. As shown in FIG. 9, the user equipment 102 and the base station 104 may communicate using a MIMO technique to increase throughput.

In some implementations, the user equipment 102 and the base station 104 may communicate using multiple MIMO layers 910, such as the example MIMO layers 911 and 912. A quantity of MIMO layers may be "n," with "n" representing some positive integer greater than one. Each MIMO layer 910 is typically transceived using a different set of physical antennas. Consequently, each respective MIMO layer 910 likely employs a different respective signal beam for higher quality signal exchange. In such cases, one or more DL data grants are indicative of multiple allocated air interface resource units 320 respectively corresponding to the multiple MIMO layers 910. To accommodate this MIMO scenario, the BS 104 allocates at least one respective second air interface resource unit 322 for each respective UL tracking communication 604 for each respective MIMO layer 910. Each respective UL tracking communication 604 is transmitted by the user equipment 102 on a respective MIMO layer 910 so that the base station 104 can learn at least one beamforming parameter 450 for use during the corresponding DL data channel communication 606 of the respective MIMO layer 910.

FIG. 9 illustrates other example aspects of fast beam tracking. For example, at least the base station 104 can enable/disable fast beam tracking as indicated at 922. The enabling or disabling can be performed on a cell-level or on a per-device level. For example, if a particular user equipment 102 has a slowly-changing set of channel conditions 521 such that beamforming parameters 450 grow stale slowly, the base station 104 can disable fast beam tracking at least for that particular user equipment 102. Enable/disable commands can be implicitly made by a base station 104 by ceasing the provision of an explicit indication 730 (of FIG. 7). Alternatively, a base station 104 can explicitly make enable/disable commands by sending out a radio resource message 511 or a DL information message 512. The user equipment 102 can maintain a record of whether fast beam tracking is enabled or disabled.

As shown at the top left of FIG. 9, the user equipment 102 includes at least one transceiver 902 (TRX 902) (e.g., a UE implementation of a transceiver 434 of FIG. 4). The at least one transceiver 902 includes at least one transmit chain 904 (TX chain 904) and at least one receive chain 906 (RX chain 906). In operation, the base station 104 is notified of a transceiver configuration possessed by the user equipment 102, such as when the user equipment 102 registers with the base station 104. Thus, the base station 104 is aware of a quantity of transmit or receive chains 904 or 906 present at the user equipment 102. This knowledge, with respect to transmit chains 904, is represented by the transmit chain presence characteristic 924 that is stored at the base station 104.

A quantity of transmit chains 904 affects how many UL transmissions the user equipment 102 can make at any given moment. For example, if the user equipment 102 has a single transmit chain 904, the user equipment 102 cannot send regular UL data traffic and an UL tracking communication 604 (e.g., of FIGS. 6-8) at the same time. Accordingly, the base station 104 schedules allocations of the air interface resource 302 so that the user equipment 102 can transmit the UL data and the UL tracking communication 604 at different times by implementing time-division multiplexing (TDM).

Generally, based on a determined quantity of transmit chains 904 (as represented at the base station 104 by the transmit chain presence characteristic 924), the base station 104 allocates portions of the air interface resource 302 to implement a TDM scheme to accommodate both UL data traffic of the user equipment 102 and UL tracking communications 604.

Having generally described schemes and apparatuses for fast beam tracking, this discussion now turns to example methods.

Example Methods

Example methods are described below with reference to various flow diagrams of FIGS. 10 and 11. These methods relate to fast beam tracking for a base station and for a user equipment, respectively. Aspects of these methods may be implemented in, for example, hardware (e.g., fixed logic circuitry, communication-oriented processors such as a modem, or general-purpose processors), firmware, or some combination thereof. These techniques may be realized using one or more of the wireless devices or components shown in FIGS. 1-9, which devices or components may be further divided, combined, and so on. The electronic devices and components of these figures generally represent firmware, hardware, IC chips, circuits, or a combination thereof. Thus, these figures illustrate some of the many possible systems or apparatuses capable of implementing the described techniques.

For these flow diagrams, the orders in which operations are shown and/or described are not intended to be construed as a limitation. Any number or combination of the described method operations can be combined in any order to implement a given method, or an alternative method. Also, operations may be omitted or added to the described techniques. Further, described operations can be implemented in fully or partially overlapping manners.

Figure 10:
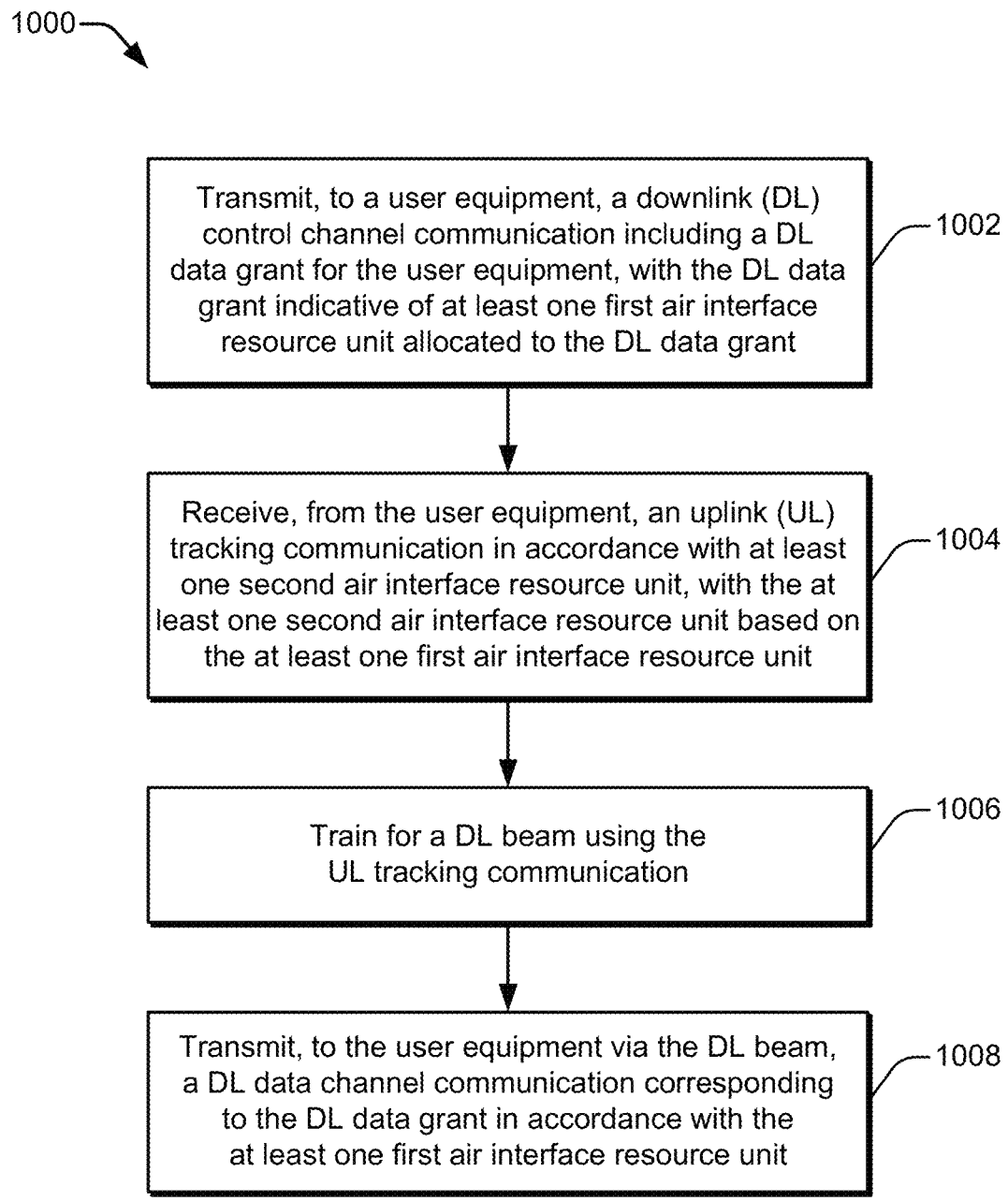
FIG. 10 illustrates example methods for a BS to implement fast beam tracking.

FIG. 10 illustrates at a flow diagram 1000 example methods for implementing fast beam tracking using a base station 104. In example implementations, the existence of DL data 706 that is present at the base station 104 and destined for a user equipment 102 triggers the process.

At 1002, the base station transmits, to a user equipment, a downlink (DL) control channel communication including a DL data grant for the user equipment, with the DL data grant indicative of at least one first air interface resource unit allocated to the DL data grant. For example, the base station 104 can transmit, to a user equipment 102, a DL control channel communication 602 including a DL data grant 702 for the user equipment 102. The DL data grant 702 is indicative of at least one first air interface resource unit 321 that is allocated to the DL data grant 702. The first air interface resource unit 321 may be defined in terms of time and frequency, such as a frame or slot and at least one subcarrier.

At 1004, the base station receives, from the user equipment, an uplink (UL) tracking communication in accordance with at least one second air interface resource unit, with the at least one second air interface resource unit based on the at least one first air interface resource unit. For example, the base station 104 can receive, from the user equipment 102, an UL tracking communication 604 in accordance with at least one second air interface resource unit 322. Here, the at least one second air interface resource unit 322 is based on the at least one first air interface resource unit 321. For instance, at least one frequency or subcarrier of the second air interface resource unit 322 may overlap a frequency range 722 of the first air interface resource unit 321. Additionally, the second air interface resource unit 322 may precede the first air interface resource unit 321 in time.

At 1006, the base station trains for a DL beam using the UL tracking communication 604. For example, the base station 104 can train for a DL beam 526 using the UL tracking communication 604. In some aspects, the base station 104 may search for known tracking information 704 (e.g., a pilot signal including a pilot-tracking code) included in the UL tracking communication 604 by adjusting beamforming parameters 450 until a strong signal is demodulated to determine a signal beam 420.

At 1008, the base station transmits, to the user equipment via the DL beam, a DL data channel communication corresponding to the DL data grant in accordance with the at least one first air interface resource. For example, the base station 104 can transmit, to the user equipment 102 via the DL beam 526, a DL data channel communication 606 corresponding to the DL data grant 702 in accordance with the at least one first air interface resource unit 321. To do so, the base station 104 may form the DL beam 526 using the determined beamforming parameters 450 and send DL data 706 to the user equipment 102.

Figure 11:
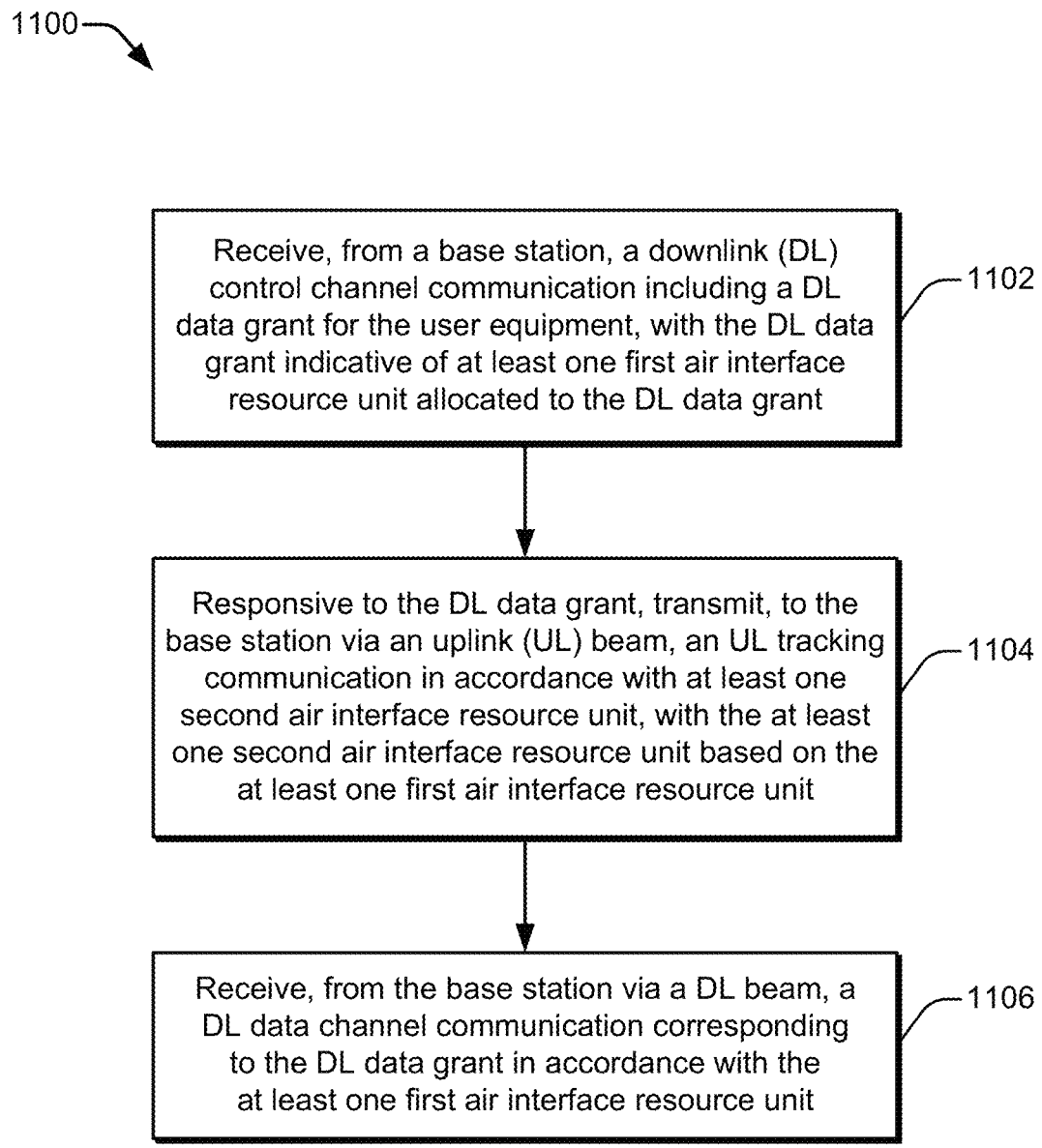
FIG. 11 illustrates example methods for a UE to implement fast beam tracking.

FIG. 11 illustrates at a flow diagram 1100 example methods for implementing fast beam tracking with a user equipment 102. In example implementations, the base station 104 may have actively enabled fast beam tracking with the user equipment 102 in a direct message or a broadcast message.

At 1102, the user equipment receives, from a base station, a downlink (DL) control channel communication including a DL data grant for the user equipment, with the DL data grant indicative of at least one first air interface resource unit allocated to the DL data grant. For example, the user equipment 102 can receive, from the base station 104, a downlink (DL) control channel communication 602 including a DL data grant 702 for the user equipment 102. The DL data grant 702 is indicative of at least one first air interface resource unit 321 allocated to the DL data grant 702. To indicate the first air interface resource unit 321, the DL data grant 702 may, for instance, include an allocated frequency range 822 and an allocated communication time 824.

At 1104, responsive to the DL data grant, the user equipment transmits, to the base station via an uplink (UL) beam, an UL tracking communication in accordance with at least one second air interface resource unit, with the at least one second air interface resource unit based on the at least one first air interface resource unit. For example, responsive to the DL data grant 702, the user equipment 102 can transmit, to the base station 104 via an UL beam 525, an UL tracking communication 604 in accordance with at least one second air interface resource unit 322. The at least one second air interface resource unit 322 is based on the at least one first air interface resource unit 321. In some aspects, the second air interface resource unit 322 may have at least one overlapping frequency or subcarrier relative to the allocated frequency range 822. Further, a transmission time 744 of the UL tracking communication 604 may be established relative to at least one of a reception time 734 of the DL control channel communication 602 or the allocated communication time 824 for the DL data channel communication 606.

At 1106, the user equipment receives, from the base station via a DL beam, a DL data channel communication corresponding to the DL data grant in accordance with the at least one first air interface resource unit. For example, the user equipment 102 can receive, from the base station 104 via a DL beam 526, a DL data channel communication 606 corresponding to the DL data grant 702 in accordance with the at least one first air interface resource unit 321. Here, the DL beam 526 has been trained by the base station 104 using the UL tracking communication 604. Due to the base station 104 having been able to recently train a beamformer using the UL tracking communication 604 to generate fresh beamforming parameters 450, the user equipment 102 is more likely to be able to receive the DL data 706 of the DL data channel communication 606 via the DL beam 526.

Additional Examples

In the following, some examples are described.

Example 1: A method for a base station comprising: transmitting, to a user equipment, a downlink (DL) control channel communication including a DL data grant for the user equipment, the DL data grant indicative of at least one first air interface resource unit allocated to the DL data grant; receiving, from the user equipment, an uplink (UL) tracking communication in accordance with at least one second air interface resource unit, the at least one second air interface resource unit based on the at least one first air interface resource unit; training for a DL beam using the UL tracking communication; and transmitting, to the user equipment via the DL beam, a DL data channel communication corresponding to the DL data grant in accordance with the at least one first air interface resource unit.

Example 2: The method of example 1, wherein: the at least one first air interface resource unit corresponds to an allocated frequency range and an allocated communication time; the at least one second air interface resource unit corresponds to at least one frequency that overlaps the allocated frequency range and a reception time that precedes the allocated communication time; and the receiving comprises receiving the UL tracking communication on the at least one frequency at the reception time.

Example 3: The method of example 2, further comprising: transmitting an indication of the reception time, the indication comprising a temporal offset relative to at least one of an allocated transmission time for the transmitting of the DL control channel communication or the allocated communication time of the at least one first air interface resource unit.

Example 4: The method of example 3, wherein the transmitting of the indication of the reception time comprises at least one of: transmitting, to multiple user equipments including the user equipment, a general indication of the reception time using a radio resource message; or transmitting, to the user equipment, a user-equipment-specific indication of the reception time using a DL information message.

Example 5: The method of example 4, wherein: the DL control channel communication comprises part of a Physical Downlink Control Channel (PDCCH); the UL tracking communication comprises part of an Uplink Beam-Tracking Pilot Channel (UBTPC); the DL data channel communication comprises part of a Physical Downlink Shared Channel (PDSCH); the radio resource message comprises a Radio Resource Control (RRC) message; and the DL information message comprises a Downlink Control Information (DCI) message.

Example 6: The method of example 2, further comprising: transmitting an indication of the reception time, the indication comprising an identification of at least one symbol position of an air interface resource.

Example 7: The method of any of examples 1 to 6, wherein: the UL tracking communication includes tracking information for beam training; the training comprises learning one or more beamforming parameters using the tracking information received from the UL tracking communication; and the transmitting of the DL data channel communication comprises forming the DL beam using the one or more beamforming parameters.

Example 8: The method of any of examples 1 to 7, further comprising: dynamically enabling and disabling use of UL tracking communications for the user equipment based on a channel condition between the base station and the user equipment.

Example 9: The method of any of examples 1 to 8, further comprising: determining a quantity of transmit chains present at the user equipment; and based on the determined quantity of transmit chains, allocating portions of an air interface resource to implement time-division multiplexing (TDM) to accommodate both UL data traffic of the user equipment and UL tracking communications transmitted from the user equipment.

Example 10: The method of any of examples 1 to 9, further comprising: receiving, from the user equipment, a respective UL tracking communication of multiple UL tracking communications per a respective multiple-input, multiple-output (MIMO) layer of multiple MIMO layers; training for multiple DL beams using the multiple UL tracking communications; and transmitting, to the user equipment via the multiple DL beams, multiple DL data channel communications.

Example 11: A method for a user equipment comprising: receiving, from a base station, a downlink (DL) control channel communication including a DL data grant for the user equipment, the DL data grant indicative of at least one first air interface resource unit allocated to the DL data grant; responsive to the DL data grant, transmitting, to the base station via an uplink (UL) beam, an UL tracking communication in accordance with at least one second air interface resource unit, the at least one second air interface resource unit based on the at least one first air interface resource unit; and receiving, from the base station via a DL beam, a DL data channel communication corresponding to the DL data grant in accordance with the at least one first air interface resource unit.

Example 12: The method of example 11, wherein: the at least one first air interface resource unit corresponds to an allocated frequency range and an allocated communication time; and the transmitting comprises transmitting the UL tracking communication using at least one frequency that overlaps the allocated frequency range at a transmission time that precedes the allocated communication time.

Example 13: The method of example 12, further comprising: determining the transmission time relative to at least one of the allocated communication time or an allocated reception time of the DL control channel communication.

Example 14: The method of any of examples 11 to 13, wherein the transmitting comprises transmitting the UL tracking communication including at least one pilot-tracking code to the base station via the UL beam.

Example 15: The method of any of examples 11 to 14, wherein: the receiving of the DL control channel communication comprises receiving the DL data grant on a Physical Downlink Control Channel (PDCCH); the transmitting comprises transmitting tracking information via the UL beam that is directed toward the base station on an Uplink Beam-Tracking Pilot Channel (UBTPC); and the receiving of the DL data channel communication comprises receiving DL data for the DL data grant on a Physical Downlink Shared Channel (PDSCH).

Example 16: A user equipment comprising: an antenna array; a wireless transceiver coupled to the antenna array; and a processor and memory system configured to use the wireless transceiver and the antenna array to implement a fast beam-tracking manager configured to: receive, from a base station, a downlink (DL) control channel communication including a DL data grant for the user equipment, the DL data grant indicative of at least one first air interface resource unit allocated to the DL data grant; responsive to the DL data grant, transmit, to the base station via an uplink (UL) beam, an UL tracking communication in accordance with at least one second air interface resource unit, the at least one second air interface resource unit based on the at least one first air interface resource unit; and receive, from the base station via a DL beam, a DL data channel communication corresponding to the DL data grant in accordance with the at least one first air interface resource unit.

Example 17: The user equipment of example 16, wherein: the at least one first air interface resource unit corresponds to an allocated frequency range and an allocated communication time; the at least one second air interface resource unit corresponds to at least one frequency that overlaps the allocated frequency range; the UL beam comprises a beam emanating from the antenna array and directed toward the base station; and the fast beam-tracking manager is further configured to transmit the UL tracking communication using the at least one frequency that overlaps the allocated frequency range.

Example 18: The user equipment of example 17, wherein the fast beam-tracking manager is further configured to: transmit the UL tracking communication using multiple subcarriers that comprise a portion of a plurality of subcarriers corresponding to the allocated frequency range; and transmit the UL tracking communication at a transmission time that is based on a temporal offset relative to at least one of the allocated communication time or an allocated reception time of the DL control channel communication.

Example 19: The user equipment of any of examples 16 to 18, wherein: the wireless transceiver is configured to communicate using a quantity of multiple multiple-input, multiple-output (MIMO) layers, the quantity being greater than one; the DL data grant indicates multiple allocated air interface resource units respectively corresponding to the multiple MIMO layers; and the fast beam-tracking manager is further configured to transmit, to the base station via multiple UL beams, multiple UL tracking communications based on the multiple allocated air interface resource units.

Example 20: The user equipment of any of examples 16 to 19, wherein: the at least one first air interface resource unit corresponds to a first carrier; the at least one second air interface resource unit corresponds to the first carrier; and the fast beam-tracking manager is further configured to: receive the DL control channel communication on a second carrier; transmit the UL tracking communication on at least a portion of the first carrier; and receive the DL data channel communication on the first carrier.

Example 21: A base station comprising: an antenna array; multiple wireless transceivers coupled to the antenna array; and a processor and memory system configured to use the multiple wireless transceivers and the antenna array to implement a fast beam-tracking manager that is configured to perform the method of any of examples 1 to 10.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B,"

or as permitting both "A" and "B"). Also, as used herein, a phrase referring to "at least one of" a list of items refers to any combination of those items, including single members. For instance, "at least one of: a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description. Although implementations for fast beam tracking have been described in language specific to certain features and/or methods, the subject of the appended claims is not necessarily limited to the specific features or methods described. Rather, the specific features and methods are disclosed as example implementations for fast beam tracking.

What is claimed is:

1. A method for a base station comprising:
transmitting, to a user equipment, a downlink (DL) control channel communication including a DL data grant for the user equipment, the DL data grant indicative of at least one first air interface resource unit allocated to the DL data grant, the at least one first air interface resource unit corresponding to an allocated frequency range and an allocated communication time;
receiving, from the user equipment, an uplink (UL) tracking communication on at least one frequency and at a reception time in accordance with at least one second air interface resource unit, the at least one second air interface resource unit based on the at least one first air interface resource unit with the at least one frequency at least partially overlapping the allocated frequency range and with the reception time preceding the allocated communication time;
training for a DL beam using the UL tracking communication; and
transmitting, to the user equipment via the DL beam, a DL data channel communication corresponding to the DL data grant in accordance with the at least one first air interface resource unit.

2. The method of claim 1, wherein:
the at least one frequency of the at least one second air interface resource unit perforates the allocated frequency range of the at least one first air interface resource unit.

3. The method of claim 1, further comprising:
transmitting an indication of the reception time, the indication comprising a temporal offset relative to at least one of a transmission time for the transmitting of the DL control channel communication or the allocated communication time of the at least one first air interface resource unit.

4. The method of claim 3, wherein the transmitting of the indication of the reception time comprises at least one of:
transmitting, to multiple user equipments including the user equipment, a general indication of the reception time using a radio resource message; or
transmitting, to the user equipment, a user-equipment-specific indication of the reception time using a DL information message.

5. The method of claim 4, wherein:
the DL control channel communication comprises part of a Physical Downlink Control Channel (PDCCH);
the UL tracking communication comprises part of an Uplink Beam-Tracking Pilot Channel (UBTPC);
the DL data channel communication comprises part of a Physical Downlink Shared Channel (PDSCH); and
at least one of:
the radio resource message comprises a Radio Resource Control (RRC) message; or
the DL information message comprises a Downlink Control Information (DCI) message.

6. The method of claim 1, further comprising:
transmitting an indication of the reception time, the indication comprising an identification of at least one symbol position of an air interface resource.

7. The method of claim 1, wherein:
the UL tracking communication includes tracking information for beam training;
the training comprises learning one or more beamforming parameters using the tracking information received from the UL tracking communication; and
the transmitting of the DL data channel communication comprises forming the DL beam using the one or more beamforming parameters.

8. The method of claim 1, further comprising:
dynamically enabling and disabling use of UL tracking communications for the user equipment based on a channel condition between the base station and the user equipment.

9. The method of claim 1, further comprising:
determining a quantity of transmit chains present at the user equipment; and
based on the determined quantity of transmit chains, allocating portions of an air interface resource to implement time-division multiplexing (TDM) to accommodate both UL data traffic of the user equipment and UL tracking communications transmitted from the user equipment.

10. The method of claim 1, further comprising:
receiving, from the user equipment, multiple UL tracking communications each per a respective multiple-input, multiple-output (MIMO) layer of multiple MIMO layers;
training for multiple DL beams using the multiple UL tracking communications; and
transmitting, to the user equipment via the multiple DL beams, multiple DL data channel communications.

11. A method for a user equipment comprising:
receiving, from a base station, a downlink (DL) control channel communication including a DL data grant for the user equipment, the DL data grant indicative of at least one first air interface resource unit allocated to the DL data grant, the at least one first air interface resource unit corresponding to an allocated frequency range and an allocated communication time;
responsive to the DL data grant, transmitting, to the base station via an uplink (UL) beam, an UL tracking communication on at least one frequency and at a transmission time in accordance with at least one second air interface resource unit, the at least one second air interface resource unit based on the at least one first air interface resource unit with the at least one frequency at least partially overlapping the allocated frequency range and with the transmission time preceding the allocated communication time; and
receiving, from the base station via a DL beam, a DL data channel communication corresponding to the DL data grant in accordance with the at least one first air interface resource unit.

12. The method of claim 11, wherein:
the at least one frequency of the at least one second air interface resource unit perforates the allocated frequency range of the at least one first air interface resource unit.

13. The method of claim 11, further comprising:
determining the transmission time based on a temporal offset that is relative to at least one of the allocated communication time or a reception time of the DL control channel communication.

14. The method of claim 11, wherein the transmitting comprises transmitting the UL tracking communication including at least one pilot-tracking code to the base station via the UL beam.

15. The method of claim 11, wherein:
the receiving of the DL control channel communication comprises receiving the DL data grant on a Physical Downlink Control Channel (PDCCH);
the transmitting comprises transmitting tracking information via the UL beam on an Uplink Beam-Tracking Pilot Channel (UBTPC); and
the receiving of the DL data channel communication comprises receiving DL data for the DL data grant on a Physical Downlink Shared Channel (PDSCH).

16. A user equipment comprising:
an antenna array;
a wireless transceiver coupled to the antenna array; and
a processor and memory system configured to use the wireless transceiver and the antenna array to implement a fast beam-tracking manager configured to:
receive, from a base station, a downlink (DL) control channel communication including a DL data grant for the user equipment, the DL data grant indicative of at least one first air interface resource unit allocated to the DL data grant, the at least one first air interface resource unit corresponding to an allocated frequency range and an allocated communication time;
responsive to the DL data grant, transmit, to the base station via an uplink (UL) beam, an UL tracking communication on at least one frequency and at a transmission time in accordance with at least one second air interface resource unit, the at least one second air interface resource unit based on the at least one first air interface resource unit with the at least one frequency at least partially overlapping the allocated frequency range and with the transmission time preceding the allocated communication time; and
receive, from the base station via a DL beam, a DL data channel communication corresponding to the DL data grant in accordance with the at least one first air interface resource unit.

17. The user equipment of claim 16, wherein:
the at least one frequency of the at least one second air interface resource unit perforates the allocated frequency range of the at least one first air interface resource unit; and
the UL beam comprises a beam emanating from the antenna array.

18. The user equipment of claim 16, wherein the fast beam-tracking manager is further configured to:
transmit the UL tracking communication using multiple subcarriers that comprise a portion of a plurality of subcarriers corresponding to the allocated frequency range; and
transmit the UL tracking communication at the transmission time that is based on a temporal offset relative to at least one of the allocated communication time or a reception time of the DL control channel communication.

19. The user equipment of claim 16, wherein:
the wireless transceiver is configured to communicate using a quantity of multiple multiple-input, multiple-output (MIMO) layers, the quantity being greater than one;
the DL data grant indicates multiple allocated air interface resource units respectively corresponding to the multiple MIMO layers; and
the fast beam-tracking manager is further configured to transmit, to the base station via multiple UL beams, multiple UL tracking communications based on the multiple allocated air interface resource units.

20. The user equipment of claim 16, wherein:
the at least one first air interface resource unit corresponds to a first carrier;
the at least one second air interface resource unit corresponds to the first carrier; and
the fast beam-tracking manager is further configured to:
receive the DL control channel communication on a second carrier;
transmit the UL tracking communication on at least a portion of the first carrier; and
receive the DL data channel communication on the first carrier.

* * * * *